US007665064B2

(12) United States Patent
Able et al.

(10) Patent No.: US 7,665,064 B2
(45) Date of Patent: Feb. 16, 2010

(54) SYSTEMS AND METHODS FOR WEB SERVICE FUNCTION, DEFINITION, IMPLEMENTATION, AND/OR EXECUTION

(75) Inventors: Steve L. Able, Canton, GA (US); Roland S. Martin, Marietta, GA (US)

(73) Assignee: GT Software, Inc., Atlanta, GA (US)

( * ) Notice: Subject to any disclaimer, the term of this patent is extended or adjusted under 35 U.S.C. 154(b) by 243 days.

(21) Appl. No.: 11/129,597

(22) Filed: May 13, 2005

(65) Prior Publication Data

US 2005/0256882 A1 Nov. 17, 2005

Related U.S. Application Data

(60) Provisional application No. 60/571,652, filed on May 14, 2004.

(51) Int. Cl.
*G06F 9/44* (2006.01)
(52) U.S. Cl. .................................................... 717/117
(58) Field of Classification Search ......... 717/104–105, 717/109–110, 123–124, 117; 709/203, 232, 709/246; 707/100, 104.1; 719/310, 328; 713/153
See application file for complete search history.

(56) References Cited

U.S. PATENT DOCUMENTS 6,510,468 B1 * 1/2003 Hayne ........................ 709/246

| 6,981,257 | B2 | 12/2005 | Teubner |
| 7,278,134 | B2 * | 10/2007 | Ricke ........................ 717/123 |
| 7,370,075 | B2 * | 5/2008 | Farquharson et al. ....... 719/328 |
| 2004/0207659 | A1 * | 10/2004 | Goodman et al. ........... 345/762 |
| 2005/0086360 | A1 * | 4/2005 | Mamou et al. .............. 709/232 |

OTHER PUBLICATIONS

IBM, CICS Service Flow Runtime User's Guide, Nov. 22, 2005.
IBM, CICS Transaction Server for OS/390 Version 1 Release 3: Web Support and 3270 Bridge, Nov. 1999.
Amrehn et al., CICS Transaction Server for VSE/ESA: CICS Web Support, Nov. 2000.

* cited by examiner

*Primary Examiner*—Tuan Anh Vu
(74) *Attorney, Agent, or Firm*—Jason A. Bernstein; Barnes & Thornburg LLP

(57) ABSTRACT

The present invention relates to systems and methods for defining, implementing, deploying and/or executing Web services. A Web service is defined using a graphical interface that allows the application developer to specify the operation of the Web service through inclusion and configuration of graphical nodes representing particular operations and/or functions. The environment for definition typically includes a user input device, a graphical display device, a system data store and a system processor. The system processor is in communication with the other elements. A graphical definition of the Web service is stored in the system data store. Once defined, the graphical definition is convened into a programmatic implementation executable by a Web services server. This programmatic implementation can then be transmitted to an appropriate Web services server accessible by an intended user community.

26 Claims, 33 Drawing Sheets

```
Import COBOL Source                                              [Import]
                                                                 [Cancel]
To import a copybook, select its top level item and click Import. You can press and hold Ctrl to select multiple
                                                                 [Help]

[-] GIISMCC
  [-] COPYBOOK
    [-] Contents of GIISMCC
          05  CA-CONVERSATION-STATE    PIC X.
              88  CA-MAIN-MENU-SENT        VALUE 'M'.
              88  CA-DETAIL-SCREEN-SENT    VALUE 'D'.
              88  CA-SOAP-REQ              VALUE 'S'.
        *
          05  MODE                     PIC X.
              88  CA-DISPLAYING            VALUE 'D'.
              88  CA-MODIFYING             VALUE 'M'.
              88  CA-DELETING              VALUE 'X'.
              88  CA-ADDING                VALUE 'A'.
              88  CA-SEARCHING             VALUE 'S'.

05  CA-NO ERROR              PIC X.
              88  CA-NO ERROR              VALUE ' '.
```

```
File Edit View Insert Format Help

<ServerInstructions>
<IvoryServerInstructions webserviceName="AcctMain" URI="/soap/samples/acctmain" Description="Sample Account Number Lookup b
  <SaveValues>
    <Save Staticvalue="S" saveID="Save1" />
  </SaveValues>
  <WebServiceOperationNode NodeID="GetAccountNum" Description="GetAccountNum is the only operation performed by this web se
    <SOAPInputs>
      <SimpleType Field="lastName" SaveID="Save2" FQN="lastName" />
      <SimpleType Field="firstName" SaveID="Save3" FQN="firstName" />
    </SOAPInputs>
    <SOAPOutputs>
      <ComplexType Field="AcctInfo" DataType="Complex Type" FQN="AcctInfo" TypeName="AcctInfoType" >
        <SimpleType Field="firstName" FQN="AcctInfo.firstName" />
        <SimpleType Field="lastName" FQN="AcctInfo.lastName" />
        <SimpleType Field="accountNumber" FQN="AcctInfo.accountNumber" />
      </ComplexType>
    </SOAPOutputs>
    <PointNodeLINK NodeID="AcctMain1" Program="GIISM01" SySID="1" ICopybookName="giismcc.iv0" OCopybookName="giismcc.iv0" >
      <SaveValues>
        <Save Field="Root.CA-SEARCHDATA.FILLER3[].CA-SRCH-LAST" Index1="1" SaveID="Save5" />
        <Save Field="Root.CA-SEARCHDATA.FILLER2[].CA-SRCH-FIRST" Index1="1" SaveID="Save4" />
        <Save Field="Root.CA-SEARCHDATA.FILLER1[].CA-SRCH-ACCT" Index1="1" SaveID="Save6" />
      </SaveValues>
```

MATCH TO FIG. 4B

MATCH TO FIG. 4A

```xml
<MoveToCOMMAREANode NodeID="Move lastName/firstName">
  </DataMovementCollection>
    <DataMovement Field="Root.CA-CONVERSATION-STATE" SourceSaveID="Save1"/>
    <DataMovement Field="Root.CA-MODE SourceSaveID="Save1"/>
    <DataMovement Field="Root.DETAIL-DATA.CA-LASTNAME" SourceSaveID="Save2"/>
    <DataMovement Field="Root.DETAIL-DATA.CA-FIRSTNAME" SourceSaveID="Save2"/>
  </DataMovementCollection>
  <ExecuteLINKNode NodeID  LINK to ACCTMAIN >
  <Move ToOutputNode NodeID="Get accountNum" >
  <DataMovementCollection>
    <DataMovement Field="AcctInfo.firstName ComplexName="True"TotalParts="2"SourceSaveID="Save4" >
      <ComplexPart Part="AcctInfo"/>
      <ComplexPart Part="firstName"/>
    </DataMovement>
    <DataMovement Field="AcctInfo.lastName ComplexName="True"TotalParts="2"SourceSaveID="Save5" >
      <ComplexPart Part="AcctInfo"/>
      <ComplexPart Part="lastName"/>
    </DataMovement>
    <DataMovement Field="AcctInfo.accountNumber" ComplexName="True"TotalParts="2"SourceSaveID="Save6" >
      <ComplexPart Part="AcctInfo"/>
      <ComplexPart Part="accountNumber"/>
    </DataMovement>
  </DataMovementCollection>
  <OperationEndNode NodeID="Send Result"/>
  </Move ToOutputNode>
  </ExecuteLINKNode>
  </PointNodeLINK>
</MoveToCOMMAREANode>
</WebServiceOperationNode>
</IvoryServerInstructions>
```

Fig. 4B

```
                              Command Line Processor

IVORY:/>cd webservices
IVORY:/webservices>dir
Directory for IVORY:/webservices
02/15/2005 08:32:44      1  < DIR >  CallableServices
03/03/2005 21:22:49      1  < DIR >  demo
01/20/2005 10:45:14      1  < DIR >  jpmcsoap
04/29/2004 08:46:19      1  < DIR >  soap
08/16/2004 10:24:30      1  < DIR >  soap.test
11/04/2004 10:24:30      1  < DIR >  soapsecu
02/15/2005 13:31:16      1  < DIR >  soaptest
03/14/2005 13:35:43      1  < DIR >  TCA
02/15/2005 11:22:57      1  < DIR >  test
04/05/2005 07:46:44      1  < DIR >  vjr
11/01/2004 18:01:19      1  < DIR >  webservices
                                     0 files
                                     11 subdirectories 67276 bytes used
                                     1035597816 bytes free IVORY:/webservices>
Command ===>                                                          More
F1=HElp  F3=EXit  F7=Bwd  F8=Fwd  F9=RETRieve
```

*Fig. 5*

MATCH TO FIG.13B

```
Output                                                                                    ⌐ ×
Starting Deploy To Server, issuing Build
Build Started: Project: acctmain
Location: C:\Documents and Settings\ykang\My Documents\Demo\Ivory-samples_v2.0l\Ivory_Projects\AcctMain3270\AcctMain\acctmain.ivp
System: YKANG3

Date/Time: 4/22/2005 4:16:04 PM
-----------------------------------
Validating Project...
   Start: "Last Name to Account Number"
   Web Service Operation: "GetAccountNum"
   LINK Point Node: "AcctMain1"
   Move to LINK: "Move lastName/FirstName"
   Execute LINK: "LINK to ACCTMAIN"
   Move to Output: "Get accountNum"
   Operation End: "Send Result"
Generating Server Instructions...
Generating WSDL...
   Operation: GetAccountNum
   SOAP Action: urn:GetAccountNum
   Description: GetAccountNum is the only operation performed by this Web service. Additional operations can be created as needed. Each wil[
Build Complete.
----------- Done -----------
Successful Build, connecting to Ivory Server
Uploading files to Ivory Server...
Files uploaded to Ivory Server, Deploy to Server completed successfully
▼
Output
```

*Fig. 22*

```
DEV at 3270 host=gtdev.gtsoftware.com port=9923
File  Edit  View  Settings  Tools  Help GT Account Sample
--- Search an account --------------------------------------------

Last Name  : SMITH
    First Name :

--- Process an account -------------------------------------------

Action         :    Display   Add   Change   Delete
    Account number :

--- Account Info -------------------------------------------------
    Acct# Title First Name    Last Name           Address                 S       Limit
    10001 MR    STEVE          SMITH               1122 BLUE EYES RD       N    20000.00

01 record(s) found
Press Enter to Search or go to Action, Clear to Exit

005/024                                                                                OverType
```

Fig. 24

| |
|---|
| 3270 Field |
| Copybook Field |
| SOAP Input |
| Static Text |
| Web Service Client Output |
| Work Variable |

*Fig. 27*

| |
|---|
| 3270 Field |
| Copybook Field |
| SOAP Input |
| Static Text |
| Web Service Client Output |
| Work Variable |

*Fig. 28*

SYSTEMS AND METHODS FOR WEB SERVICE FUNCTION, DEFINITION, IMPLEMENTATION, AND/OR EXECUTION

CROSS-REFERENCE TO RELATED APPLICATION

The present application claims priority pursuant to 35 U.S.C. §119(e) to commonly owned U.S. Provisional Application No. 60/571,652 filed May 14, 2004 entitled "SYSTEMS AND METHODS FOR WEB SERVICE FUNCTION, DEFINITION, IMPLEMENTATION, AND/OR EXECUTION," which application is hereby fully incorporated herein for all purposes by this reference.

BACKGROUND

The present application is directed to systems and methods for Web Service function, definition, implementation, and/or execution. The Internet is a global network of connected computer networks. Over the last several years, the Internet has grown in significant measure. A large number of computers on the Internet provide information in various forms. Anyone with a computer connected to the Internet can potentially tap into this vast pool of information.

The information available via the Internet encompasses information available via a variety of types of application layer information servers such as SMTP (Simple Mail Transfer Protocol), POP3 (Post Office Protocol), GOPHER (RFC 1436), WAIS, HTTP (Hypertext Transfer Protocol, RFC 2616) and FTP (File Transfer Protocol, RFC 1123).

One of the most wide spread methods of providing information over the Internet is via the World Wide Web (the Web). The Web consists of a subset of the computers connected to the Internet; the computers in this subset run HTTP servers ("Web servers"). Several extensions and modifications to HTTP have been proposed including, for example, an extension framework (RFC 2774) and authentication (RFC 2617). Information on the Internet can be accessed through the use of a Uniform Resource Identifier ("URI," RFC 2396). A URI uniquely specifies the location of a particular piece of information on the Internet. A URI will typically be composed of several components. The first component typically designates the protocol by which the address piece of information is accessed (e.g., HTTP, GOPHER, etc.). This first component is separated from the remainder of the URI by a colon (':'). The remainder of the URI will depend upon the protocol component. Typically, the remainder designates a computer on the Internet by name, or by IP number, as well as a more specific designation of the location of the resource on the designated computer. For instance, a typical URI for an HTTP resource might be:

http://www.server.com/dir1/dir2/resource.htm

Where HTTP is the protocol, www.server.com is the designated computer name and /dir1/dir2/resouce.htm designates the location of the resource on the designated computer. The term URI includes Uniform Resource Names ("URNs") including URNs as defined according to RFC 2141.

Web servers host information in the form of Web pages; collectively the server and the information hosted are referred to as a Web site. A significant number of Web pages are encoded using the Hypertext Markup Language ("HTML") although other encodings using Standard Generalized Markup Language ("SGML"), eXtensible Markup Language ("XML"), Dynamic HTML ("DHMTL") (the combination of HTML, style sheets and scripts that allows documents to be animated) or Extensible HyperText Markup Language ("XHTML") are possible. The published specifications for these languages are incorporated by reference herein; such specifications are available from the World Wide Web Consortium and its Web site (http://www.w3.org). Web pages in these formatting languages may include links to other Web pages on the same Web site or another. As will be known to those skilled in the art, Web pages may be generated dynamically by a server by integrating a variety of elements into a formatted page prior to transmission to a Web client. Web servers, and information servers of other types, await requests for the information from Internet clients.

Client software has evolved that allows users of computers connected to the Internet to access this information. Advanced clients such as Netscape's Navigator and Microsoft's Internet Explorer allow users to access software provided via a variety of information servers in a unified client environment. Typically, such client software is referred to as browser software.

Web services further facilitate access to information on the Internet by computer users. Web services address the need to integrate legacy mainframe applications by acting as platform-independent interfaces that allow communication with other applications using standards-based Internet technologies, such as HTTP and XML. With traditional integration techniques, there are multiple point-to-point communication and data conversions that may change as new applications are integrated or data formats change. Web services simplify integration by reducing the number of Application Program Interfaces ("API") to one, Simple Object Access Protocol ("SOAP") and the number of data formats to one, XML. SOAP overlays XML and transmits data in a way that can be understood and accepted by Web browsers and servers. The XML is also human readable. Web services allow programmers to make databases and/or other applications available across the Web for other programmers to access them and link the applications together to provide services.

Web services using the request and response methods are further described as being a Service Oriented Architecture ("SOA") approach to integration of electronic business applications or processes. A service-oriented architecture is essentially a collection of services. These services communicate with each other as described previously. The communication can involve either simple data passing or it could involve two or more services coordinating some activity. The methods of connecting services to each other involve the protocols and transport methods of SOAP.

Web Services Description Language ("WSDL") is a format for describing a Web services interface. It is a way to describe services and how they should be bound to specific network addresses. The WSDL includes three parts: definition, operations and service bindings.

WSDL definitions are generally expressed in XML and include both data type definitions and message definitions that use the data type definitions. These definitions are usually based on some agreed upon XML vocabulary. This agreement could be within an organization or between organizations. Vocabularies within an organization could be designed specifically for that organization. They may or may not be based on some industry-wide vocabulary. If data type and message definitions need to be used between organizations, then most likely an industry-wide vocabulary will be used.

WSDL operations are grouped into port types. Port types define a set of operations supported by the Web service.

WSDL service bindings connect port types to a port. A port is defined by associating a network address with a port type. A collection of ports defines a service. This binding is commonly created using SOAP protocols and transport methods.

IBM created a SOAP interface for CICS (Customer Information Control System) which only supported a one-to-one relationship between the SOAP request and to the application code. This process does not provide automatic parsing and processing between the SOAP XML and the application communication areas. It also fails to provide any method for processing 3270 BMS applications. The IBM process provides neither flow processing nor graphical interface tooling with the SOAP process.

A main problem of most computer-based systems is their lack of ability to create composite processing in a Web service environment. A primary aspect of the Web service software described herein is to provide composite-based application processing using existing application software. Present systems lack support for a variety of functionality in the Web service area. Present systems do not support application flow and processing multiple applications via a single SOAP request would provide a much-needed process to the market place. Further, programmers have a significant learning curve to build the required XML and WSDL files required for SOAP processing.

SUMMARY

The present application is directed to systems and methods for Web services function, definition, implementation, and/or execution. In one aspect, Web services are defined with respect to one or more functions available from applications executing on one or more remote systems. In a further aspect, such definitions are used to generate a programmatic implementation that is communicated to a Web services server executing on, or in communication with, the remote system(s). In yet another aspect, Web services clients can then use the defined service by posting appropriate requests to the Web services server and receiving back from that server a response encoding the results of performing the requested Web service.

One application for Web service definition and/or development may be referred to herein as the studio or modeling software. The modeling software can also be described as the application flow designer for the patent application. The modeler can preferably be implemented in software executable on a typical computer having a system data store ("SDS") and a system processor; however, the modeler functionality, or portions thereof, may be implemented in whole, or in part, via hardware. In addition, or instead, the modeler functionality, or portions thereof, can be embodied in instructions executable by a computer, where such instructions are stored in and/or on one or more computer readable media.

An application for generating a programmatic implementation that is communicated to a Web services server may be referred to herein as a server or rule-based flow engine. The manager can preferably be implemented in software executable on a typical computer having an SDS and a system processor, however, the server functionality, or portions thereof, may be implemented in whole, or in part, via hardware. In addition, or instead the server functionality or portions thereof, can be embodied in instructions executable by a computer, where such instructions are stored in and/or on one or more computer readable media. In some implementations the server functionality can be standalone, performed within the studio or performed within the server.

A Web services server preferably incorporates an SDS, a system processor, and one or more interfaces to one or more communications channels that may include one or more interfaces to user workstations over which electronic communications are transmitted and received. In addition, or instead, the server functionality, or portions thereof, can be embodied in instructions executable by a computer, where such instructions are stored in and/or on one or more computer readable media.

A Web services client ("Requestor") executing on a computer communicates a Web service request to the Web services server ("Provider"). The Web services server executes the programmatic implementation of the defined Web service to generate a response. The response is then communicated to the Requestor. The Provider may execute one or more applications on the system execute the server and/or one or more remote systems in order to generate the response.

In each of the studio and server processes, the system processor is in communication with the respective SDS via any suitable communication channel(s); system processor may further be in communication with the one or more communication interfaces via the same, or differing, communication channel(s). Each system processor may include one or more processing elements that provide electronic communication reception, transmission, interrogation, analysis, processing and/or other functionality. In some implementations, the system processor can include local, central and/or peer processing elements depending upon equipment and the configuration thereof. It should be noted that the modeler, manager, server (and client) are summarized above as discrete components; however, these various components all together, or taken in any selected grouping, could be implemented within a single execution environment where a particular system processor and/or SDS could support one or more such components. Each SDS may include multiple physical and/or logical data stores for storing the various types of information. Data storage and retrieval functionality may be provided by either the system processor or data storage processors associated with, or included within, the SDS.

The studio provides an automated graphical process of collection of information to define and build the Web service process using an SOA. The studio process provides a graphical flow of the application processes required to build a request and response SOAP-based Web service. The graphical flow or model is then used to create the rules or execution path the server must follow to provide the requested SOAP response. Composite application processing can be provided via the modeling or rules-based process, the designer also provides for external logic processing to control the logic flow through the multiple applications.

The manager may optimize its data movement processing and lower storage requirements by only holding data or storage as long as needed. Work meta data fields can be used to dynamically modify control settings at runtime. This process allows the modeler and manager to communicate changes to the flow before runtime that take place at runtime. The manager can allow for called projects, so that an application program can call other application flows at any time based on application or business requirements. This can provide a very powerful way to extend working application flows. An application flow can call other deployed application flows at any time during its processing.

In another aspect, a flow processing engine is disclosed in some implementations that processes movement of data to and from standard application meta data formats to and from the SOAP XML meta data formats. This process reduces the need of the application programmer having to know or understand SOAP and XML processing and having to code additional application program to process SOAP and XML. This can significantly reduce the time to market and the possibility for errors to be introduced into the process. In a further aspect, some implementations of the modeler disclosed herein can increase programmer productivity by allowing a drag and drop interface for building application flows and data movements between one or many applications. Development time can be greatly reduced because the need to build routines to parse and move the XML data to/from existing meta data formats is eliminated.

A further feature of some implementations includes processing pure SOAP, XML and WSDL creation using a composite application process that allows mapping and data movements without any code to be created and executed. Some such implementations may provide processing via a runtime image that processes the XML rules and instructions for processing the application flow, external logic and data movement processing.

Additional advantages will be set forth in part in the description which follows, and in part will be obvious from the description, or may be learned by practice of the systems and methods described herein. The advantages of the disclosed systems and methods will be realized and attained by means of the elements and combinations particularly pointed out herein. It is to be understood that both the foregoing general description and the following detailed description are exemplary and explanatory only and are not restrictive of the invention as claimed below.

BRIEF DESCRIPTION OF DRAWINGS

The accompanying drawings, which are incorporated in and constitute a part of this specification, illustrate various aspects of the disclosed systems and methods and together with the description, serve to explain and/or exemplify their principles.

FIG. 2 depicts an exemplary import interface for an example modeler.

FIG. 4 depicts an example rule set generated in a typical modeler environment.

FIG. 5 depicts a directory listing for a file repository in an exemplary modeler.

FIG. 22 represents an example output window.

FIG. 24 depicts a sample data input into the example screen in FIG. 23.

FIG. 27 represents use of a drop-down menu for selecting a data sources for an exemplary node.

FIG. 28 represents use of a drop-down menu for selecting a data sources for an exemplary node.

DETAILED DESCRIPTION

Figure 1:
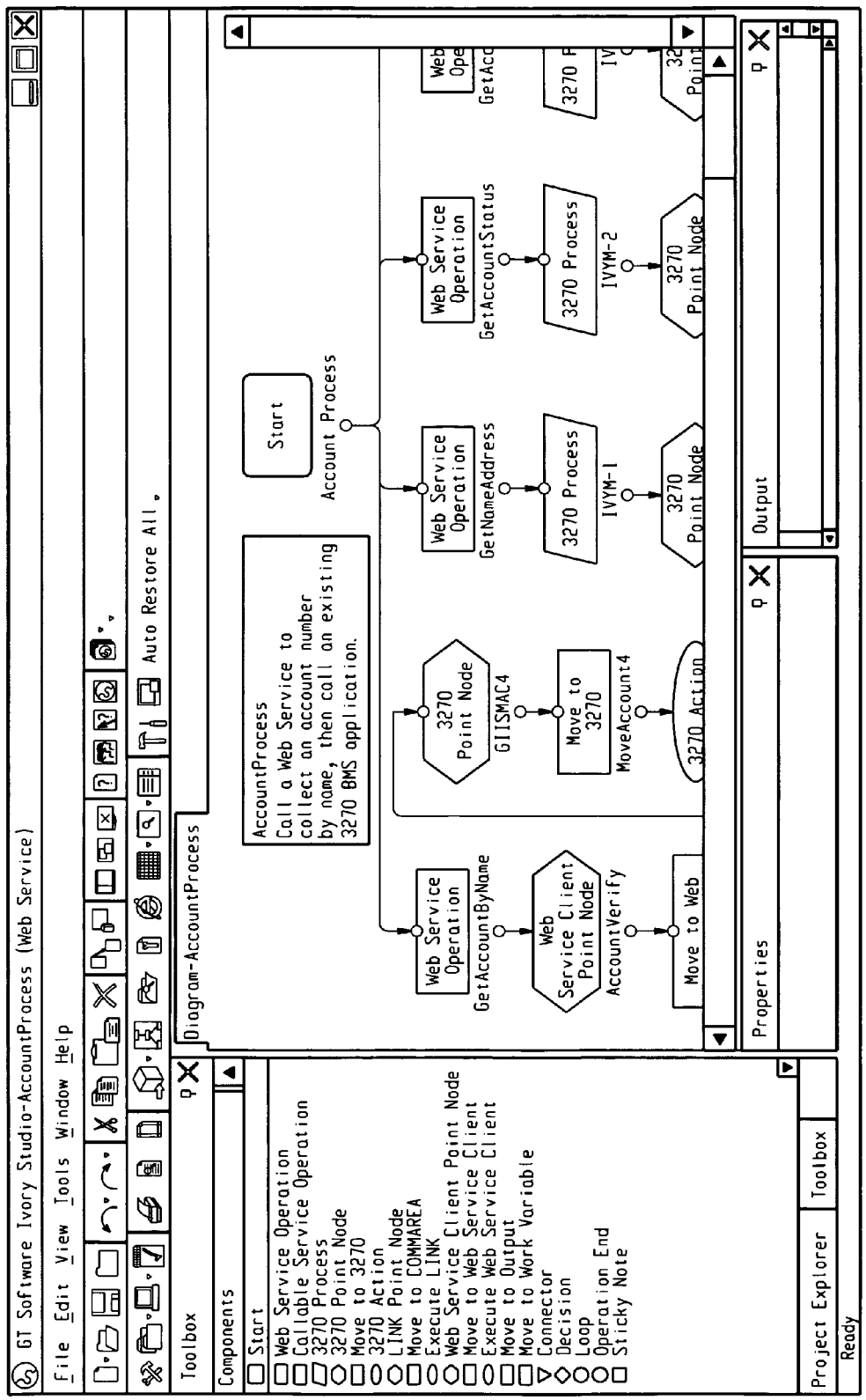
FIG. 1 depicts an example graphical user interface for a typical modeler environment.

Exemplary systems and methods are now described in detail. Referring to the drawings, like numbers indicate like parts throughout the views. As used in the description herein, the meaning of "a," "an," and "the" includes plural reference unless the context clearly dictates otherwise. Also, as used in the description herein, the meaning of "in" includes "in" and "on" unless the context clearly dictates otherwise. Finally, as used in the description herein, the meanings of "and" and "or" include both the conjunctive and disjunctive and may be used interchangeably unless the context clearly dictates otherwise; the phrase "exclusive or" may be used to indicate situation where only the disjunctive meaning may apply.

The hardware of a typical execution environment for one or more of the components supporting Web services definition, implementation and/or execution include a system processor potentially including multiple processing elements, that may be distributed across the hardware components, where each processing element may be supported via a general purpose processor such as Intel-compatible processor platforms preferably using at least one PENTIUM class or CELERON class (Intel Corp., Santa Clara, Calif.) processor; alternative processors such as UltraSPARC (Sun Microsystems, Palo Alto, Calif.) and IBM zSeries class processors could be used in other implementations. In some implementations, Web services definition, implementation and/or execution (servicing) functionality, as further described below, may be distributed across multiple processing elements. The term processing element may refer to (1) a process running on a particular piece, or across particular pieces, of hardware, (2) a particular piece of hardware, or either (1) or (2) as the context allows.

Some implementations can include one or more limited special purpose processors such as a digital signal processor (DSP), application specific integrated circuits (ASIC) or a field programmable gate arrays (FPGA). Further, some implementations can use combinations of general purpose and special purpose processors.

The hardware further includes an SDS that could include a variety of primary and secondary storage elements. In one preferred implementation, the SDS would include registers and RAM as part of the primary storage. The primary storage may in some implementations include other forms of memory such as cache memory, non-volatile memory (e.g., FLASH, ROM, EPROM, etc.), etc.

The SDS may also include secondary storage including single, multiple and/or varied servers and storage elements. For example, the SDS may use internal storage devices connected to the system processor. In implementations where a single processing element supports all of the server/manger functionality and/or the modeler functionality a local hard disk drive may serve as the secondary storage of the SDS, and a disk operating system executing on such a single processing element may act as a data server receiving and servicing data requests.

It will be understood by those skilled in the art that the different information used in the systems and methods for Web service function definition, implementation, and/or execution as disclosed herein may be logically or physically segregated within a single device serving as secondary storage for the SDS; multiple related data stores accessible through a unified management system, which together serve as the SDS; or multiple independent data stores individually accessible through disparate management systems, which may in some implementations be collectively viewed as the SDS. The various storage elements that comprise the physical architecture of the SDS may be centrally located or distributed across a variety of diverse locations.

The architecture of the secondary storage of the system data store may vary significantly in different implementations. In several implementations, database(s) are used to store and manipulate the data; in some such implementations, one or more relational database management systems, such as DB2 (IBM, White Plains, N.Y.), SQL Server (Microsoft, Redmond, Wash.), ACCESS (Microsoft, Redmond, Wash.), ORACLE 8i (Oracle Corp., Redwood Shores, Calif.), Ingres (Computer Associates, Islandia, N.Y.), MySQL (MySQL AB, Sweden) or Adaptive Server Enterprise (Sybase Inc., Emeryville, Calif.), may be used in connection with a variety of storage devices/file servers that may include one or more standard magnetic and/or optical disk drives using any appropriate interface including, without limitation, IDE and SCSI. In some implementations, a tape library such as Exabyte X80 (Exabyte Corporation, Boulder, Colo.), a storage attached network (SAN) solution such as available from (EMC, Inc., Hopkinton, Mass.), a network attached storage (NAS) solution such as a NetApp Filer 740 (Network Appliances, Sunnyvale, Calif.), or combinations thereof may be used. In other implementations, the data store may use database systems with other architectures such as object-oriented, spatial, object-relational or hierarchical.

Instead of, or in addition to, those organization approaches discussed above, certain implementations may use other storage implementations such as hash tables or flat files or combinations of such architectures. Such files and/or tables could reside in a standard hierarchical file system. Such alternative approaches may use data servers other than database management systems such as a hash table look-up server, procedure and/or process and/or a flat file retrieval server, procedure and/or process. Further, the SDS may use a combination of any of such approaches in organizing its secondary storage architecture.

The hardware components may each have an appropriate operating system such as WINDOWS/NT, WINDOWS 2000 or WINDOWS/XP Server (Microsoft, Redmond, Wash.), Solaris (Sun Microsystems, Palo Alto, Calif.), or LINUX (or other UNIX variant).

In one implementation the server or manager executes on a z/OS or VSE/ESA platform and the modeler or studio executes under a WINDOWS 2000 or WINDOWS/XP operating system. The server or manager executes as a rules-based processing application using XML based instructions created by the modeler or studio software. The modeler or studio is a graphical tool for building application flows to allow processing of non-SOAP and SOAP-based applications as SOAP-based composite applications.

In some implementations, a graphical user interface is disclosed that allows business analysts and programmers to form a collaboration to build a new business process centered on Web services. For example, users may be business analysts who require a method of interfacing to a mainframe application without an in-depth knowledge of the programming and/or application execution environment. Other users might be application developers or technical support personnel tasked with building SOAP Web services for use by application servers. This aspect can allow a developer to bridge between the application logic and the business process needed to provide a SOAP Web service.

In one implementation of the methods and systems described herein, a client uses a graphical interface to build a business process by defining inputs and expected outputs and then stepping through the application using graphical icons or nodes for each step. This graphical user interface allows the modeling of a Web service via graphical objects. The graphical objects are connected using connection points to form a flow through the various applications or methods needed to create the single process or composite process web service. As seen in FIG. 1, the application flow through the various nodes controls the logic processing for several applications which provide the unique function of composite processing.

Each of the functions, (for example, business logic functions such as Link Point 3270 process and 3270 Point or Web Service Client point nodes, start and stop, logic flow, input and output movement nodes or XML/data remapping) may be represented by a graphical icon or node. The modeler software is resident on the client's workstation and converts the client's input into processing rules in a single format, for example XML. The modeler provides the server with the rules required to navigate or otherwise invoke a business logic process, a transactional or conversational type application or even Web services which exist on the same or external servers.

The server or manager is a rules-based engine used to process rules generated as instructions from the modeler. The composite processing of applications provided by the server are a direct result of building the application flow using a graphical design tool. This process provides a simple yet powerful process for building mainframe-based SOAP or SOA applications. The graphical tool serves as one facet of the overall systems and methods described herein. Use of this tool allows no additional programming to be required once the modeler tool has deployed the rules to the server or manager software. The server processes the incoming SOAP request envelope, and then processes the business logic to build the SOAP response envelope for the returned SOAP packet. The server may further allow various processes of additional functions or business logic to form a complete response. Service requestors may communicate with the server to discover the defined Web services and import the WSDL that is created by the modeler to describe and define the processing of the service. The modeler or studio tooling builds the WSDL file automatically for the client or user of the system and removes the need to have the knowledge of building these interface files. The WSDL files can then be used by other third party products such as application design tools to build the interface modules called SOAP clients or proxies to access the applications that are orchestrated by the modeler/studio and server/manager.

In some implementations, existing business logic and/or application information can be imported into the systems and methods described herein. Existing business logic and/or application information may be supported through particular formats such as BMS or copybooks. An interface can be provided for such importation such as depicted in FIG. 2. Imported business logic and/or application information can then be used to build Web services.

The importing process provides a way to communicate between various different system types, and the meta data collected through importation allow systems designers to communicate in a known language. Additional meta data may be created and/or renamed, mainly SOAP input and output meta data that is to be exposed by the Web service can be named or described using new meta data names, which can then hide the fact that the back-end system is not a Web service-based application.

Figure 3:
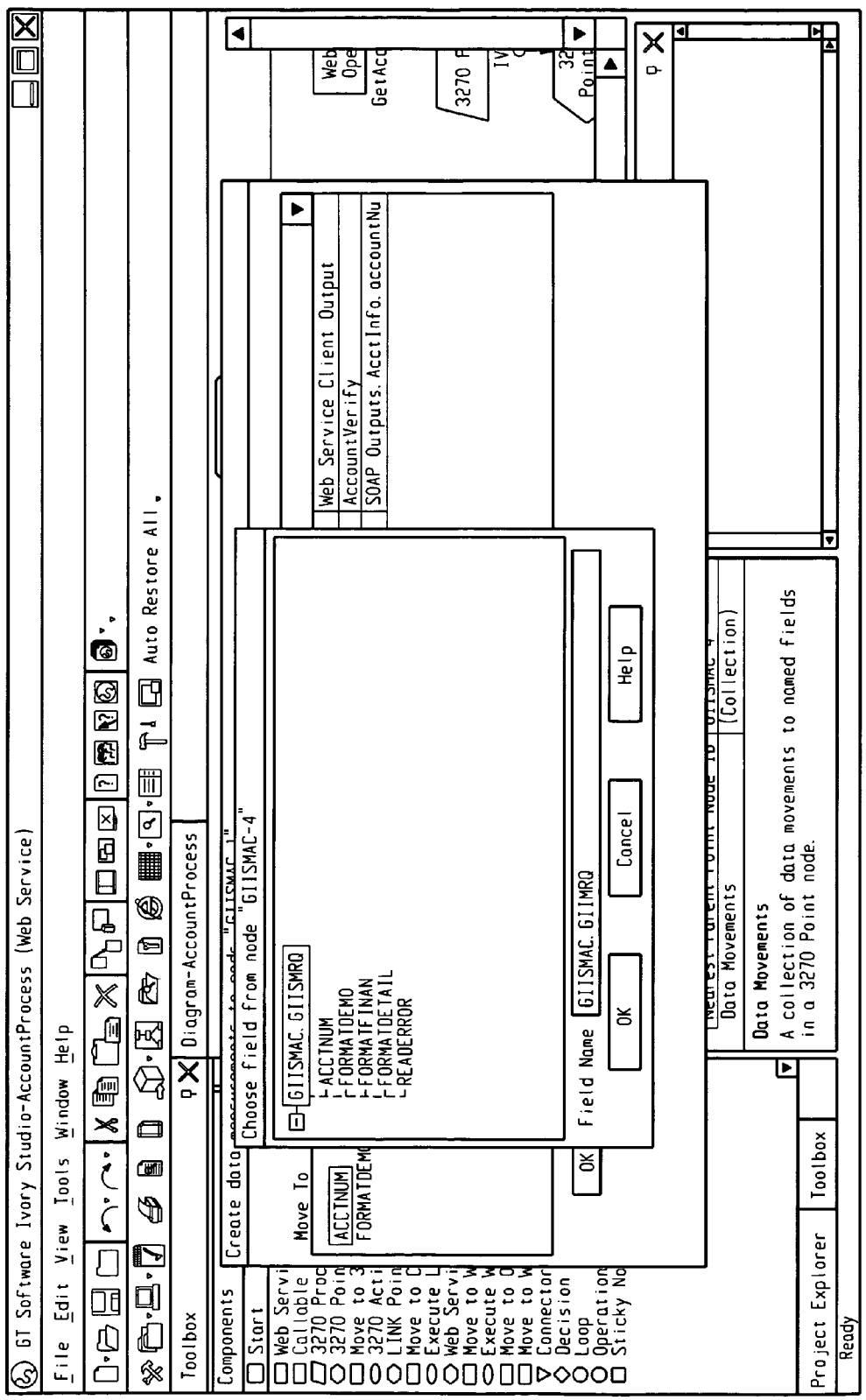
FIG. 3 depicts an exemplary data movement interface for an exemplary modeler.

The imported meta data is preferably normalized into an XML format to allow it to be processed using standard XML parsers instead of having to use a unique parser. The imported data, and/or other meta data, can be viewed in a tree fashion using tooling provided by some implementations of the modeler. FIG. 3 depicts such an example.

The graphical building of a Web service may use imported information to define communication with business logic and/or application processes. Each node has a unique function and properties that define the Web service and the operations performed by the service. For example, in a particular implementation, a Start node can describe the Web service and can serve the anchor or parent node for all other operations. A Start node can further represent multiple operations and/or configuration settings. It can, for instance, describe the location (environmental) attributes of the Web service that you are building.

Once the Web service operations have been defined the user may select the correct processing or point node. Each processing or point node defines the information required to access the target source. For example, for 3270 interface operations the target could be a CICS transaction code, or for a COMMAREA application the target could be a CICS program name. Additional data sources such as DL/I, IMS, DB2, VSAM, could also be used. As users build the diagram or model of the Web service they may connect the nodes to form the logic or processing flow. This flow will later be translated into instructions for the rules-based SOAP server process. The syntax of the diagram is verified each time a node connection is attempted to insure a valid logic path and that node connection rules are correct. The logic path is traced to insure that the connection operation is to a valid parent and is not crossing Web service operation paths or boundaries. Each Web Service Operation node defines the expected SOAP input and output for the service operation path. The WSDL is created from the properties entered for each of the nodes. This document is an XML description of the interface methods for the Web service being created.

The modeler build process may in some instance provide a verification of the Web service at the same time as it creates the server rules, WSDL and HTML to define the service.

The descriptive HTML may be static or converted to a dynamic XSTL template that will build the HTML dynamically based on the XML of the WSDL. The WSDL generated by the modeler build process can now be used, in some implementations, by an execution test and/or debug tool. Such a test and/or debug tool potentially provides for further verification of the service definition and the generated Web service interfaces. These tools can dynamically process the service information (WSDL code) to create the user interface required to verify the deployed Web service. In such implementations, the WSDL definition may serve as the interface point between Java J2EE and .NET processing. The WSDL may be processed by popular Integrated Development Environment ("IDE") products that supply the capability to automatically build the Java, C# or other language interface code for processing the Web service described by the WSDL.

The server side instructions (rules) contain a mixture of execution and data flow. These instructions can be represented in XML as a tree structure. The XML tree is derived from the project diagram and its associated settings including data movements and/or properties. The diagram itself is stored as a mostly flat entity (although it may be represented in XML) so the resultant server instructions are not required to have the same appearance as the diagram. The format of rules is preferably set to provide the highest performance, as these rules will be executed for each request of the Web service. The rules may be compressed and/or optimized to improve performance of execution. Each execution node within the server instructions contains children nodes, one of which will receive control once the parent has completed its processing. The choice of the next child to dispatch is determined at runtime by the rules engine, but the rules instructions allow all possible choices to be specified. FIG. 4 depicts a representation of the rules generated by an exemplary modeler in one particular implementation.

The model designer has complete control over server processing logic flow. There are no ambiguous execution flows within a Web service operation; the model designer details completely how the server is to operate. Data flow is completely described within the modeling diagram process. The modeler creates the server side instructions via an "n-pass" algorithm applied to the diagram XML based on the number of paths created by the client in the diagram. Server processing is a single pass of the XML server rules instructions tree. The modeler pre-notifies the server, possibly via the rules, of any data movements required to be saved for later usage to optimize the server performance. This design places the complexity burden upon the modeler to be highly optimized in its rule creation resulting in performance benefits in the server rules engine.

Figure 6:
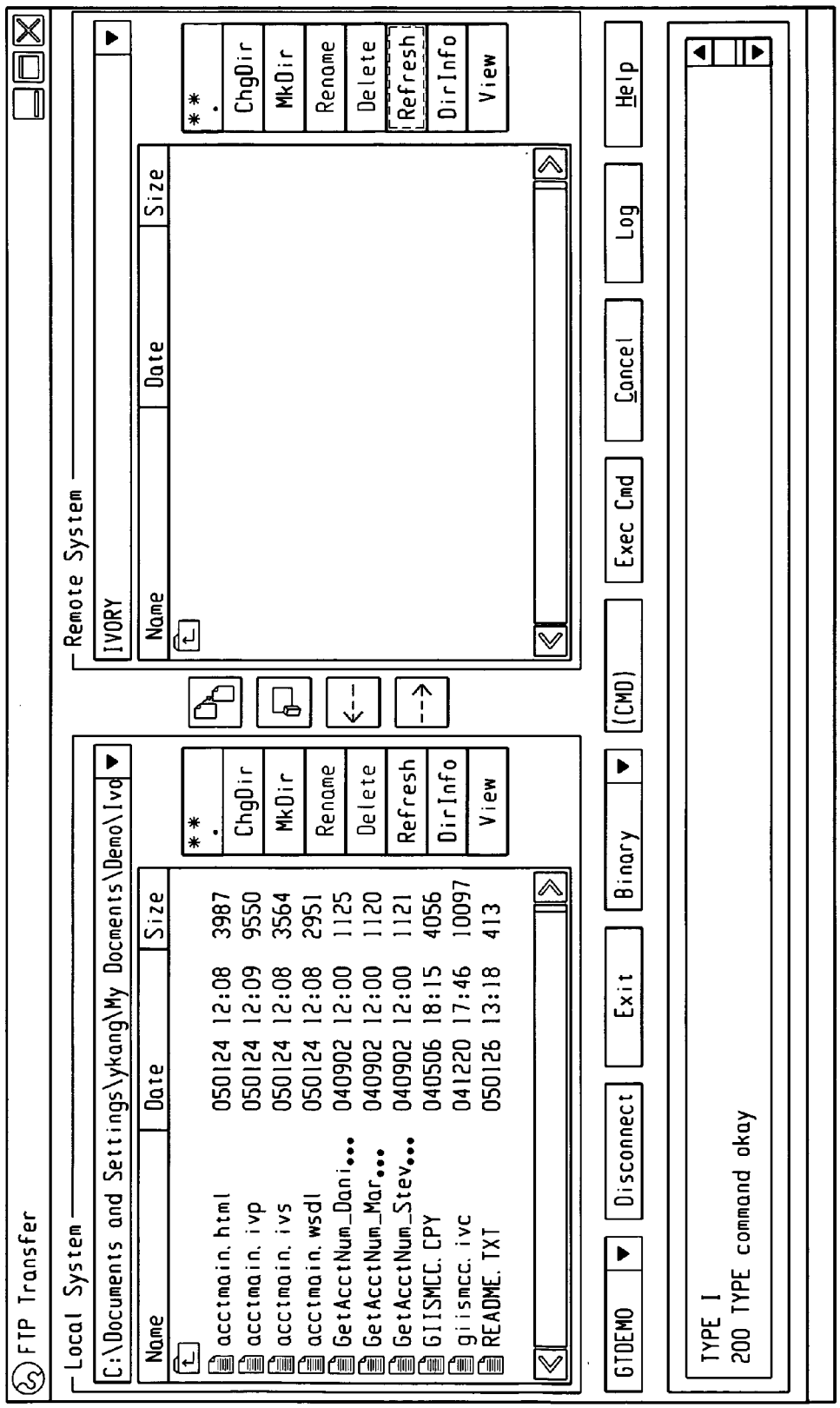
FIG. 6 provides a sample FTP interface from an exemplary modeler.

The server may be a SOAP server based on the HTTP and SOAP protocols. The particular server may support processing standard HTTP and/or secure HTTPS requests. The repository may be a Hierarchical File System based on a CICS standard VSAM KSDS file; this unique function provides support for a UNIX/Windows based file system without the need for Unix System Services on CICS. The file repository may contain a command line processor for management of the file system via a standard CICS transaction. Command examples include, but are not limited to creation of file systems in the repository, directories and data files as depicted in FIG. 5. The file system repository can also be managed from an FTP server provided such as with the SOAP server and/or via the FTP client supplied with the modeler. FIG. 6 provides an example of screen of management via an FTP server. The HTTP server and FTP server can follow the standard Internet RFCs for those protocols.

The server can provide the ability to map transactional 3270 and program-based applications into SOAP methods or objects. The heart of this process is the rules engine that is used to process the output rules instructions from the modeler. The server processes each node starting from the initial start point of the diagram. In a preferred implementation, each diagram contains the Web service name and the operations or methods the service provides. Once the method is selected from the SOAP Request envelope, the selected Web Service Operation node becomes the parent node and the logic tree that results will all branch from this common parent. For example, each node of the rule instruction set may cause the server to dispatch the function to handle the node operations. The node operations are optimized into the correct code page for the mainframe session.

Figure 7:
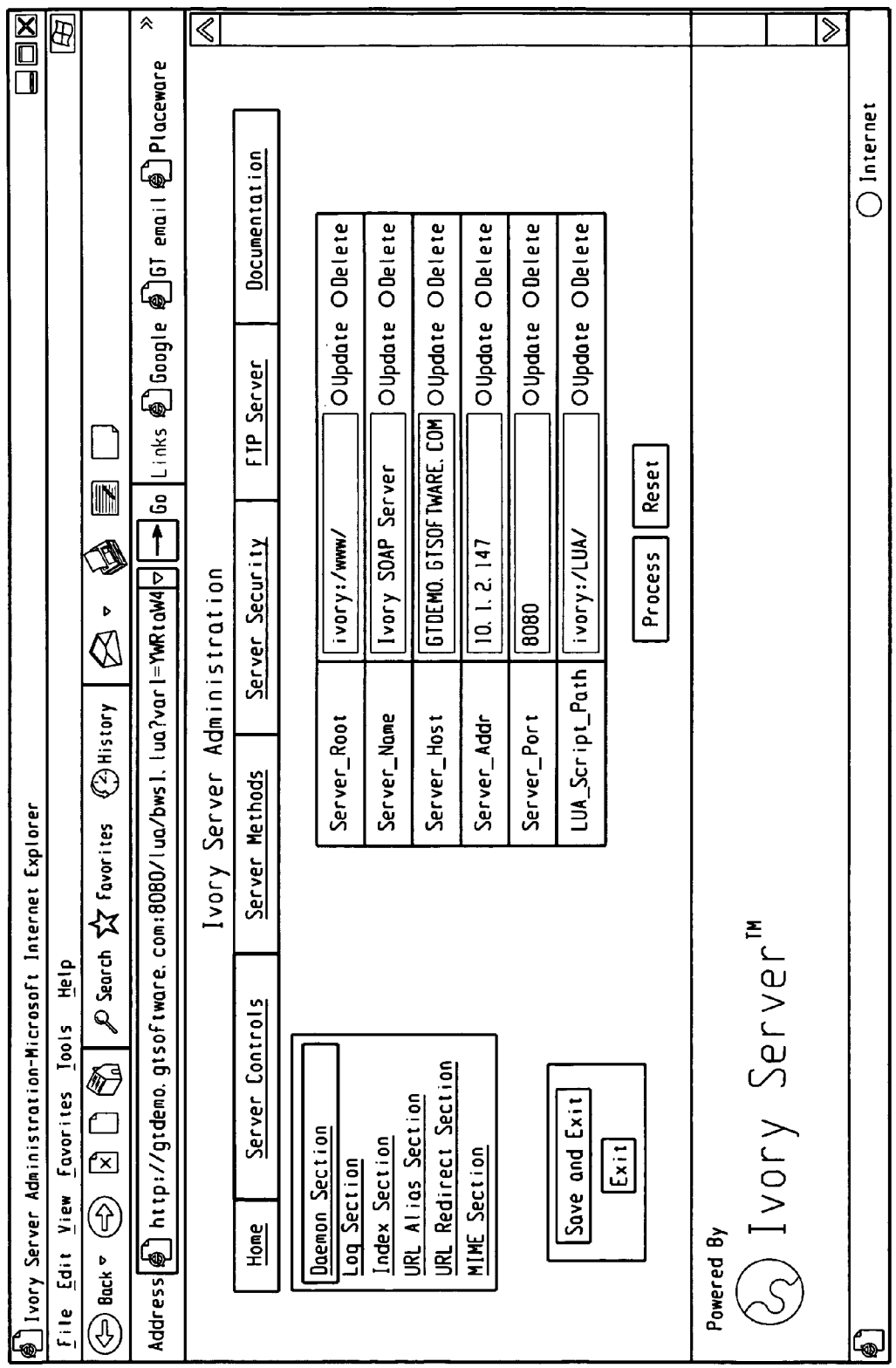
FIG. 7 is an exemplary Server Administration screen for server configuring and managing.

In a preferred implementation, the HTTP server provides the base protocol support on top of CICS Web Services. This HTTP server provides administrative utilities to manage the SOAP services and FTP servers. An example administrative screen is seen in FIG. 7. All discoveries of WSDL files and management of the HTML documentation can be stored in a Hierarchical File System (as part of the SDS).

Some implementations of the described systems and methods may incorporate a debugger or testing tool to read in the WSDL and extract all the operations that can be performed. The debugger lists the operations in a pull-down list. Once the user selects an operation from the list the input field, meta data will be used to build a tree view of the required input fields. The debugger or test tool may be used to input data for the SOAP Request envelope. For complex arrays the user may first define how many occurrences will be entered, and then the debugger will provide input area in the tree display for the occurrences of the complex type. The debug option may be added to the client modeler application and the server service provider. The debug operations may be a two-way communication path that will allow the client to know what step has been executed on the mainframe. The client notifies the server of the debug request by sending additional headers in the HTTP request to show the debugging client machine. The user may open a TCP/IP socket to listen for requests. As the server starts execution of the rules the server will send status information to the client. The modeler will show the current step in the diagram and will provide for breakpoints and other standard debug commands, such as looking at storage, setting new data values.

Figure 8:
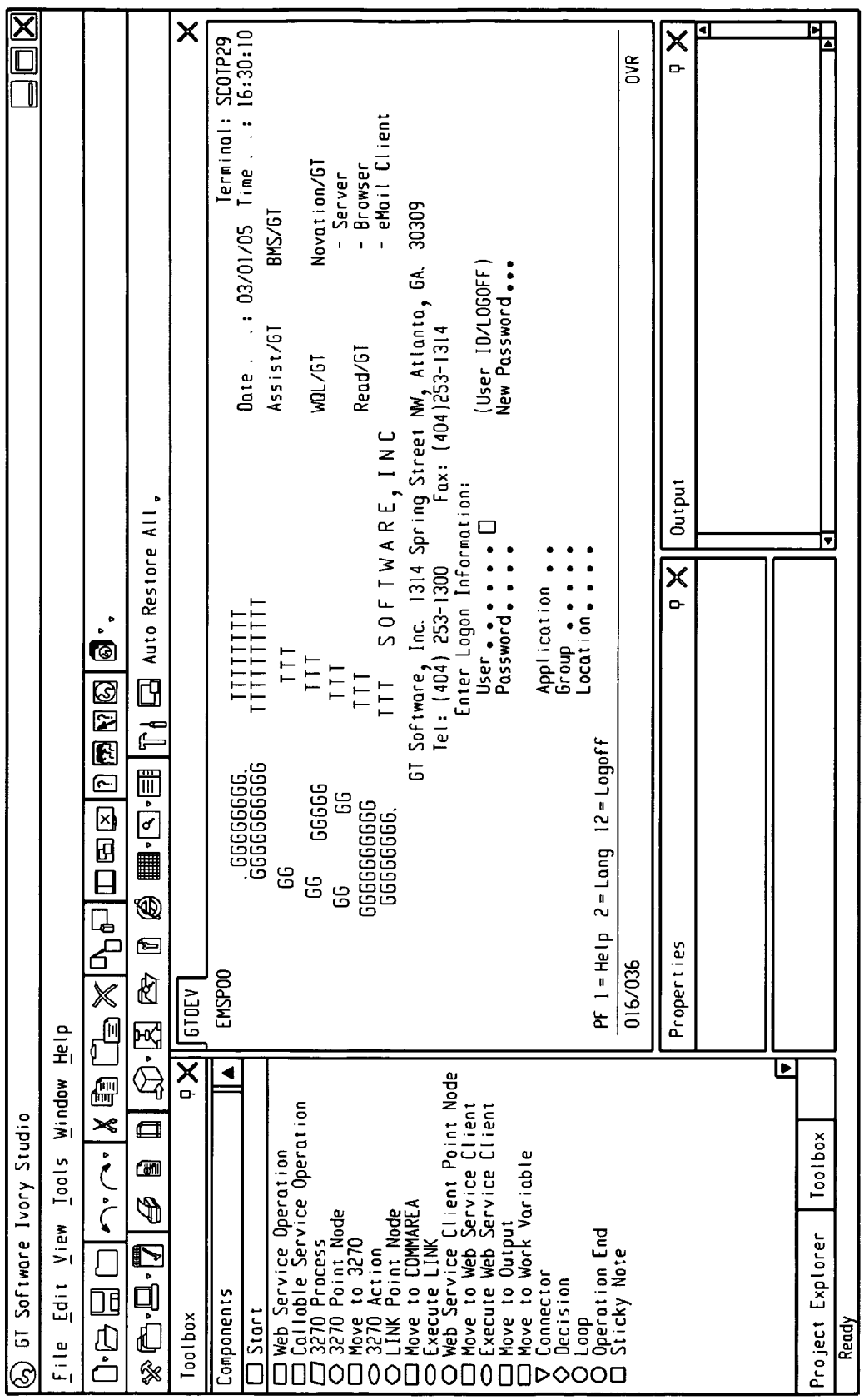
FIG. 8 depicts an exemplary TN3270 Client accessing a TN3270 Server (Emulator).

Some implementations of the described methods and systems incorporate an emulator. The emulator can be written in such a way to provide .NET access to the 3270 emulation via browser object tags, the browser may be used as the container for the emulator product. This may also extend beyond the browser into an API that allows programmatic control over the 3270/5250 applications. This will be a pure .NET solution and as such will allow any .NET language on a Microsoft platform be used to build new interfaces. The emulator can take advantage of performance improvements placed into the Windows .NET object used to build applications. The emulator can be installed in classic windows fashion, or via a browser interface. An exemplary emulator screen is seen in FIG. 8.

In some preferred implementations, the modeler process provides for building Web services by importing Basic Mapping Support macros ("BMS") and building a data structure in XML that matches the Application Data Structure ("ADS"). For example, in one implementation the model may provide a method for importing the CICS COMMAREA into an XML format much like the BMS macro layout. This provides a common layout and structure for the various application data structures that will be used.

Figure 9:
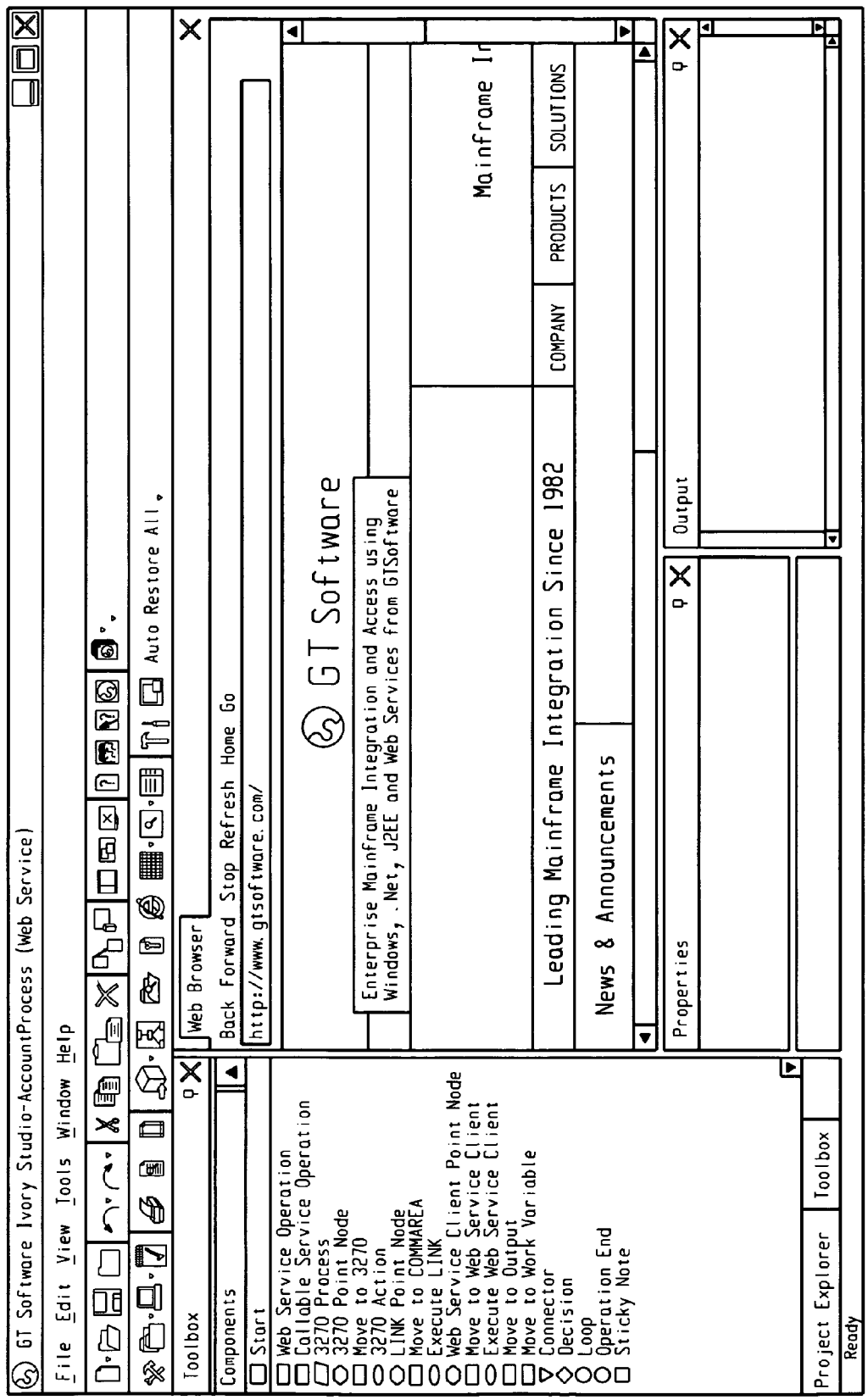
FIG. 9 depicts a potential Integrated Development Environment (IDE) for an exemplary modeler.

In some preferred implementations, a user builds a business process by defining inputs and expected outputs and then stepping through the application using graphical icons for each step. Each of the functions, for example business logic functions, starts and stop, logic flow, or XML remap, is represented by an icon. The end result is a graphical design of the application from the Web service inputs to the final Web service response. The graphical models may be self-documenting or may also provide for process documentation to be entered using "sticky notes". The modeler interfaces with an IDE, which processes the menus and windows for user selections. The general design in a preferred implementation may include dockable and moveable windows and the use of Multiple Document Interface ("MDI"). (See FIG. 5.) Menus and screen literals may optionally be based in resource files to allow for support of languages other than English. FIG. 9 depicts an exemplary screen.

Figure 10:
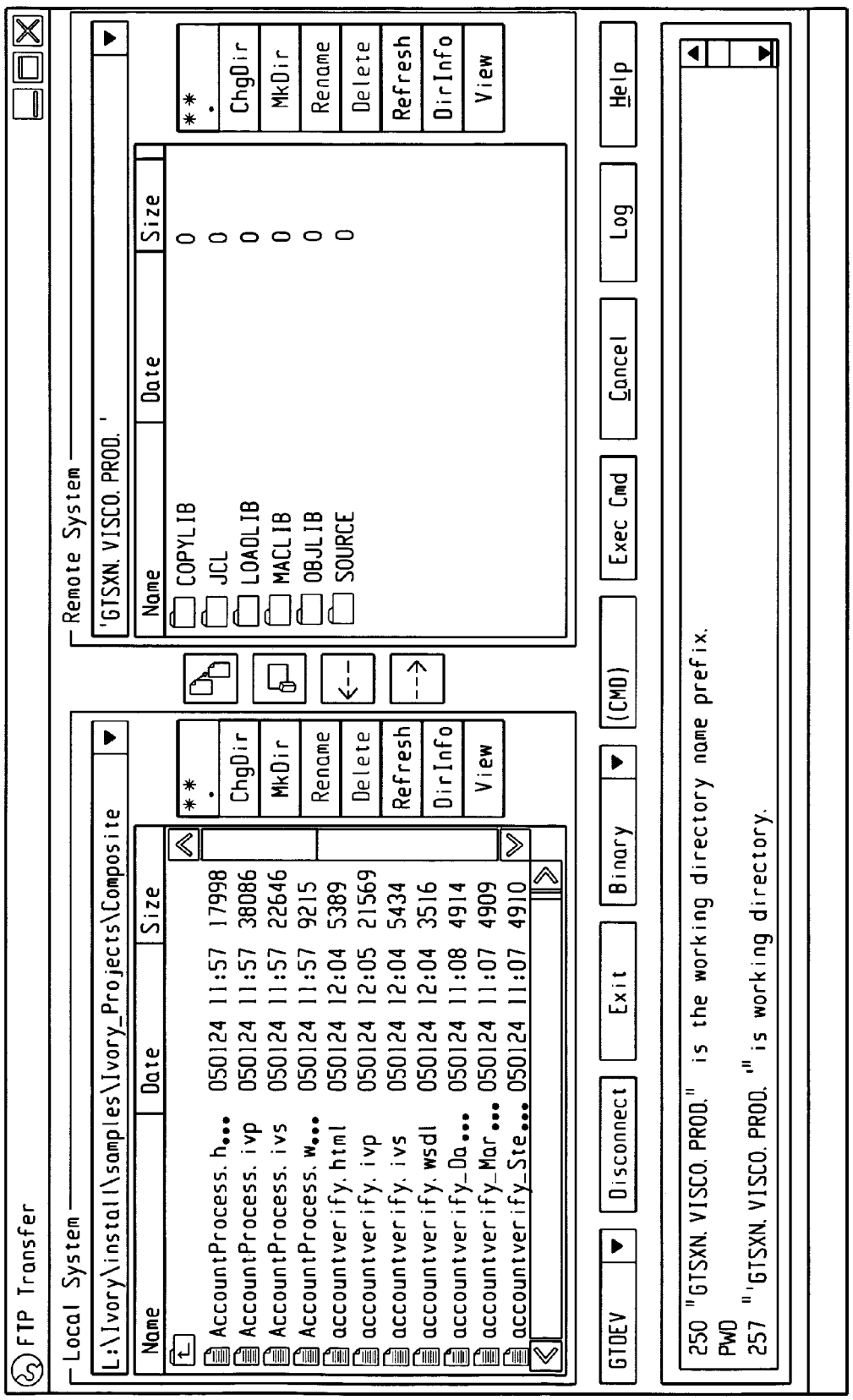
FIG. 10 is an exemplary FTP interface used in an exemplary modeler.

The modeler will allow users access to multiple applications in a single Web service by combining application available functions, in contrast to conventional systems that require having to make several calls. In order to improve compatibility with other systems, all or some files created by the modeler, including the project files, can be stored using an XML format. The modeler may incorporate functions to import copybooks that are converted to an easy to understand XML format, which allows for easy expansion of the resulting meta data dictionary. The modeler will also incorporate a BMS macro importer to convert the BMS source into XML format. An FTP client can be provided to pull copybooks and/or BMS macros from the mainframe or other computer. An exemplary interface screen is depicted in FIG. 10. The FTP client may include a meta data import function. Such a function supports ease of use by clients when importing meta data located on a remote computer system.

The modeler provides the server with all the rules engine information needed to process SOAP operations.

Manager software, for example, mainframe service routines, uses XML data collected via the modeling software to process the business rules defined in the graphical model by the user. Input to the manager will be the processing rules from the modeler and the SOAP packet. The input process will fire the manager, and it will process the business logic building a result for the returned SOAP packet.

In one preferred implementation, the server is a rules-based engine that processes the XML server instructions from the modeler. Each node is converted into a set of rules that allow the various processes of a Web service to be applied to information and procedures resident on a server, for example the CICS TS server or on IMS-based server processes.

The Start node is the initial setup and logical start of the Web service being created. The Start node defines the name of the Web service and various WSDL options such as the URI to invoke the Web service and the target namespace for the SOAP input/output fields that will be defined. The processing type of RPC (Remote Procedure Call) and Document is requested at this node.

The Web Service Operation node provides the logical name for the method or operation and provides the SOAP input and output structures. Each input field and its type is described at the Web Service Operation node. The output structure expected from the Web service is also defined at this node.

The LINK Point Node provides the interface point between the server and the Web service being created. The link point defines the name of the program to execute and the location where it should execute. CICS dynamic routing rules may be used when processing.

Some implementations may incorporate a 3270 Process node and a Point node. The Process node may cover all the setup information for the transaction code and the information required by CICS to start the 32370 process. The Point node is used to supply the current BMS mapset and map name so that data movements can be created.

Data movement nodes provide a tree structure for creation of move rules. Some examples of data movement nodes include Move to LINK, Move to 3270, and Move to Output. The movement process is based on a common code base so that all movement nodes have a similar function. The Move to LINK node, for example, may provide the method to set the initial values for the program that will be invoked. The Move to 3270 node may allow for moving data to the BMS map in order to provide input for the 3270 screen operation. In one implementation, the data that could be used for these move operations could be from static values, SOAP input request envelope, and any previously accessed 3270 map or CICS COMMAREA.

The Decision nodes provide the ability to add logic that will change the flow through the model. These nodes may be processed by the server and take action on data from any previous point node under the same Web Service Operation node. Complex operations may be defined using the Decision nodes in conjunction with Loop nodes. Decision nodes can target the current point node process for all comparison operations.

Logic Decision nodes may also be placed in the flow. These nodes allow the data to be examined and the result to modify the flow of the server rules to provide 2 paths for each decision node, so the logic paths or flows increase 2*n where n=the number of decision nodes. These nodes may provide the method for the logic flow to form a tree format. In conjunction with Decision nodes, Connector nodes may be incorporated to allow consolidation of logic paths. The Connector node may provide the method for a branch of logic to return to any logic path under the parent Web Service Operation.

Loop processing is also used within decision tree processing; a Loop node provides a method for returning to a previous node within the parent Web service operation. At times logic of applications running in CICS will require that they be executed using multiple iterations. The Loop node will allow the logic flow to return to a parent node. For 3270 BMS this might be an operation that is scrolling through several screens. For a COMMAREA application, it might be a program that requires more than one pass to collect all the returned data.

The Move to Output node allows for data to be moved from any previous point node with the same parent Web Service Operation node. The target of the movement data will be the SOAP response envelope.

The Connector nodes provide a very important process that allows several logic paths to branch out and then return to the main line logic flow.

The Operation End node is a logical placeholder to signal that the Web service operation has completed its task. All Web Service Operation node paths can connect to a single Operation End node.

A Calculation node will provide for mathematical operations to be added to the logic flow of the modeler. These nodes will process data from the application and will be used to modify the result set returned to the client. For example, the 3270 application may have a total account balance for the persons account. A Calculation node may provide support for the user who desires to process all accounts and return to a single total.

A Data Source node provides access to external file systems and database data, for example, DL/I, IMS, DB2, and other ISV databases. Each Data Source node will have unique options for each of the different Data Source databases or file systems supported. These will be added to the product on an as needed or on demand basis.

Exemplary Manager or Server Function

Figure 11:
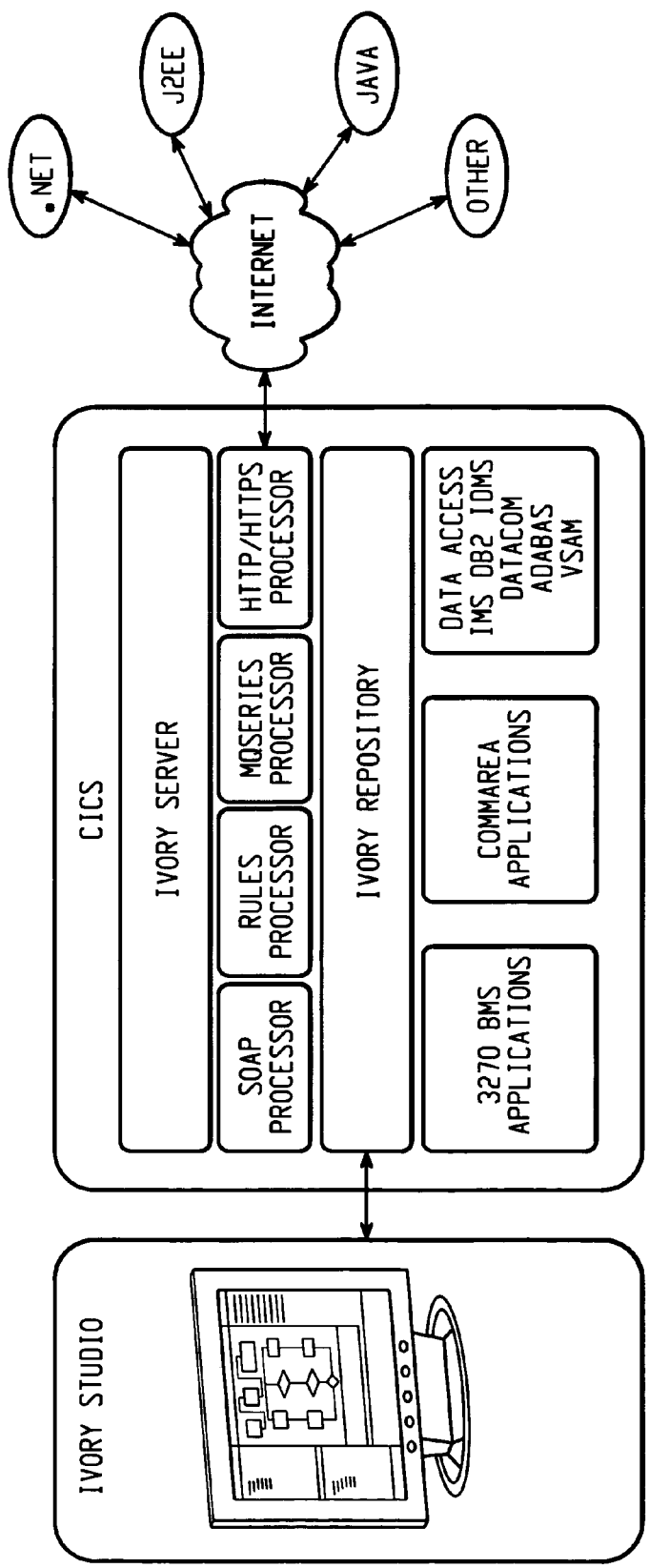
FIG. 11 is a block diagram of various components or functions of an exemplary modeler and server.
Figure 12:
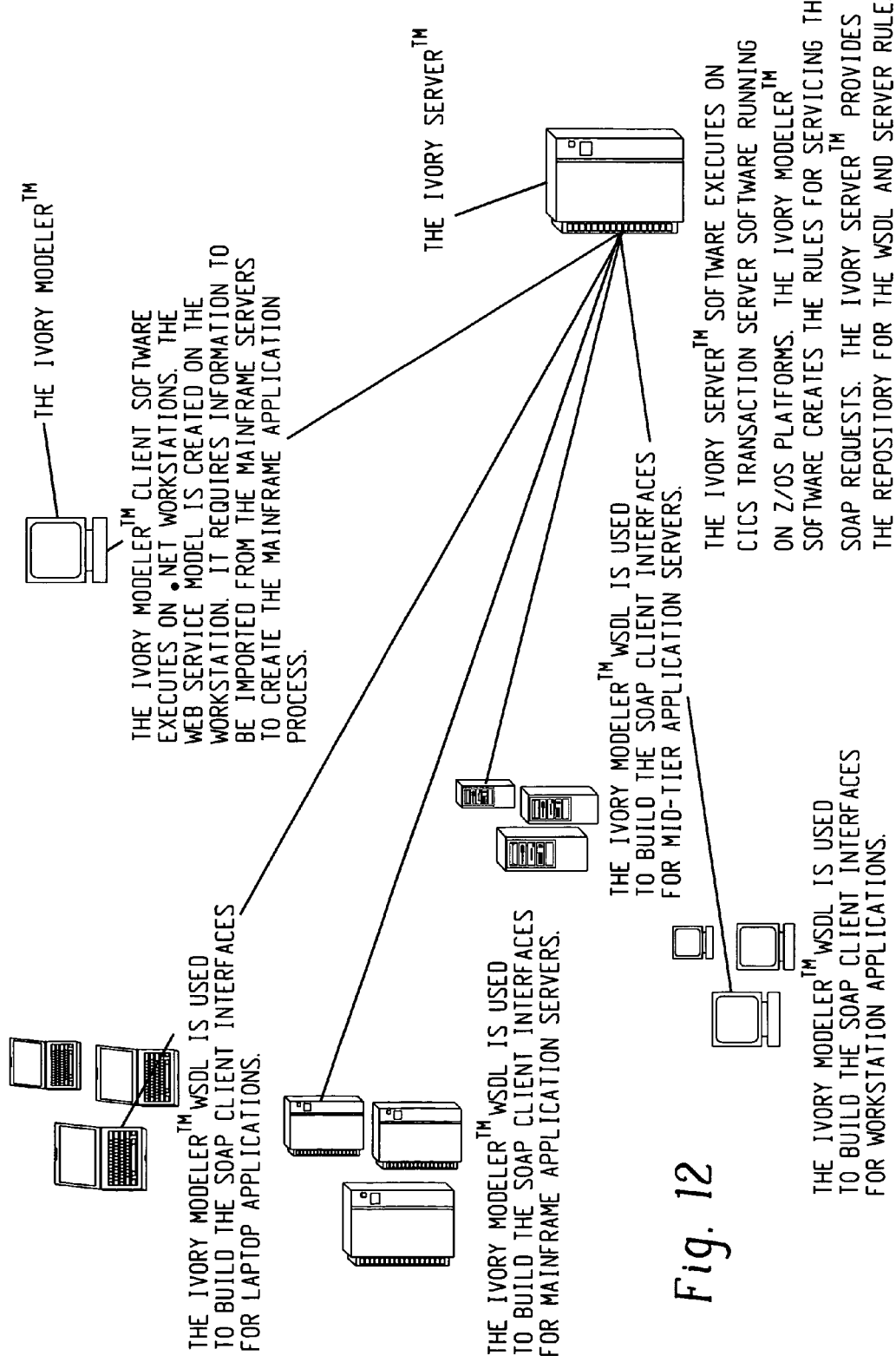
FIG. 12 is a graphic representation of a potential architecture for an exemplary modeler or server.

The following description lists some general features of an exemplary manager or server function that may be used along with a modeler or studio function to provide application flow processing and orchestration of applications. The manager or server processes all SOAP requests and handle the processing of application flow as described by the rules created by the modeler or studio process. Application orchestration provides a method to modify application flow without the need to modify the existing application code. FIG. 11 shows the various functions of the manager/server in one of the variations in which the process can exist. The studio process is the modeler that builds the rules used by the rules processor to orchestrate application flows. The manager/server and modeler/studio architecture is depicted graphically in FIG. 12.

The server process or manager process contains a set of code instructions to manage the various processing engines and may in some implementations automatically switch states between the various processing functions as needed to process an application flow or to orchestrate a composite application consisting of one or more of the application area or processes shown in the example.

The SOAP clients can be any .NET, J2EE, standard Java, third party or user created web service functions. The manager/server can itself call another manager/server running the same or different projects to complete a true distributed function. Functions may further be called from user written applications (not shown). During this process the manager or server is acting as an agent of the application and not that of a SOAP request. The processing may occur via API meta data structures instead of SOAP WSDL meta data XML files.

The following is a list of functions provided by a typical manager server for processing the application flow rules created by the modeler or studio functions.

Rules processing engine for processing execution rules provided by the modeler/studio software for orchestration of application processes along with handling all the dynamic movement of data to and from SOAP XML meta data to application specific meta data layouts. The algorithm used for application flow processing may work in conjunction with the memory management algorithm to insure that only the storage required is saved during the execution orchestration process.

HTTP or HTTPS processing of incoming SOAP requests, optionally the requests could be dropped onto an MQSeries queue for processing by the rules engine. This may include the security checking and processing required for verification that the process is valid for the passed security information.

The application meta data mapping and data transformation algorithm may be based on the imported meta data information collected from the modeler or studio execution rules instructions. This algorithm includes routines for processing data transformations between the various encoding methods of ASCII to/from EBCDIC. The server/manager may also process all the various COBOL application data types of, but not limited to: COMP, COMP-2 COMP-3, COMP-4 and POINTERS. String and decimal number processing can be processed by the data mapping functions to insure the correct decimal alignment options are processed.

Storage processing may be handled by management modules that insure only the data needed to process the movements in the project rules files are saved during the execution of the SOAP or MQSeries request.

A URI mapping module may control the processing options and security used for various SOAP requests based on any suitable technique; in one preferred implementation, a pattern matching algorithm is used.

The manager may also process WSDL discovery requests as a standard SOAP server using the ?WSDL option, but it processes the documentation of the WSDL into an HTML file that can be served out using the ?INFO request which displays the information collected by the modeler/studio functions into a human readable form of HTML so that other application developers can read and understand the requirements of the WSDL process. This can be advantageous in the debugging and analysis of the Web service.

The rules engine may be implemented a single common resource. In some implementations, this rules engine may be completely re-entrant so that it can handle multiple inbound requests.

The manager/server may also, in some implementations provide trace functions which create an XML description document that traces the functions of the last SOAP request call. The trace can be used to debug operations or look for problems.

The Callable Services Operation (CSO) module may provide an API to an application program which communicates with the CSO module via COMMAREA interface. The CSO module may operate to convert COMMAREA input requests to SOAP requests, execute the requested Web services, and deliver the results in COMMAREA output area.

Exemplary Modeler or Studio Function

Figure 13A:
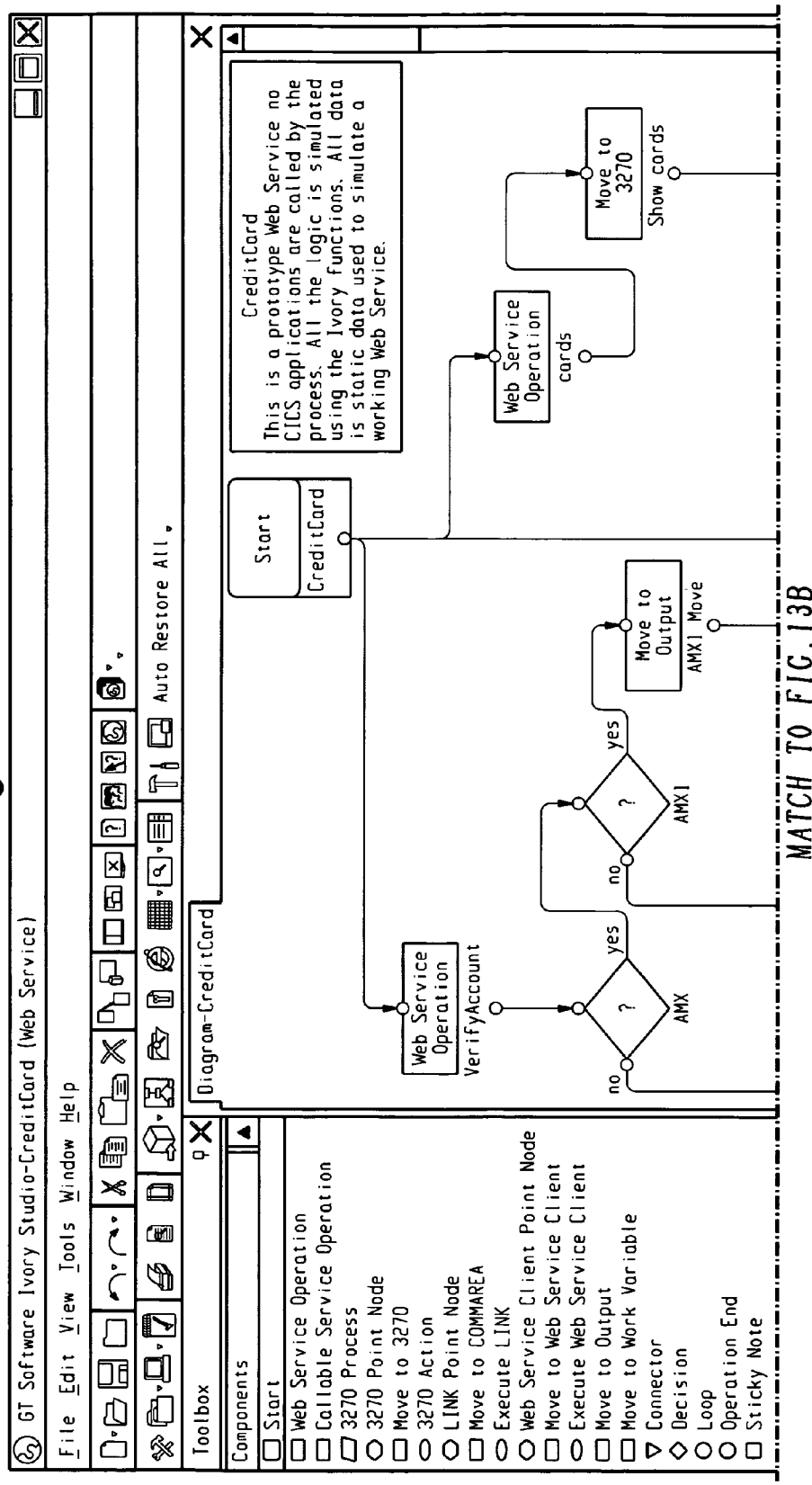
FIG. 13 is an example screen representing an IDE with MDI, drag and drop and dockable windows as used in some potential implementations.
Figure 13B:
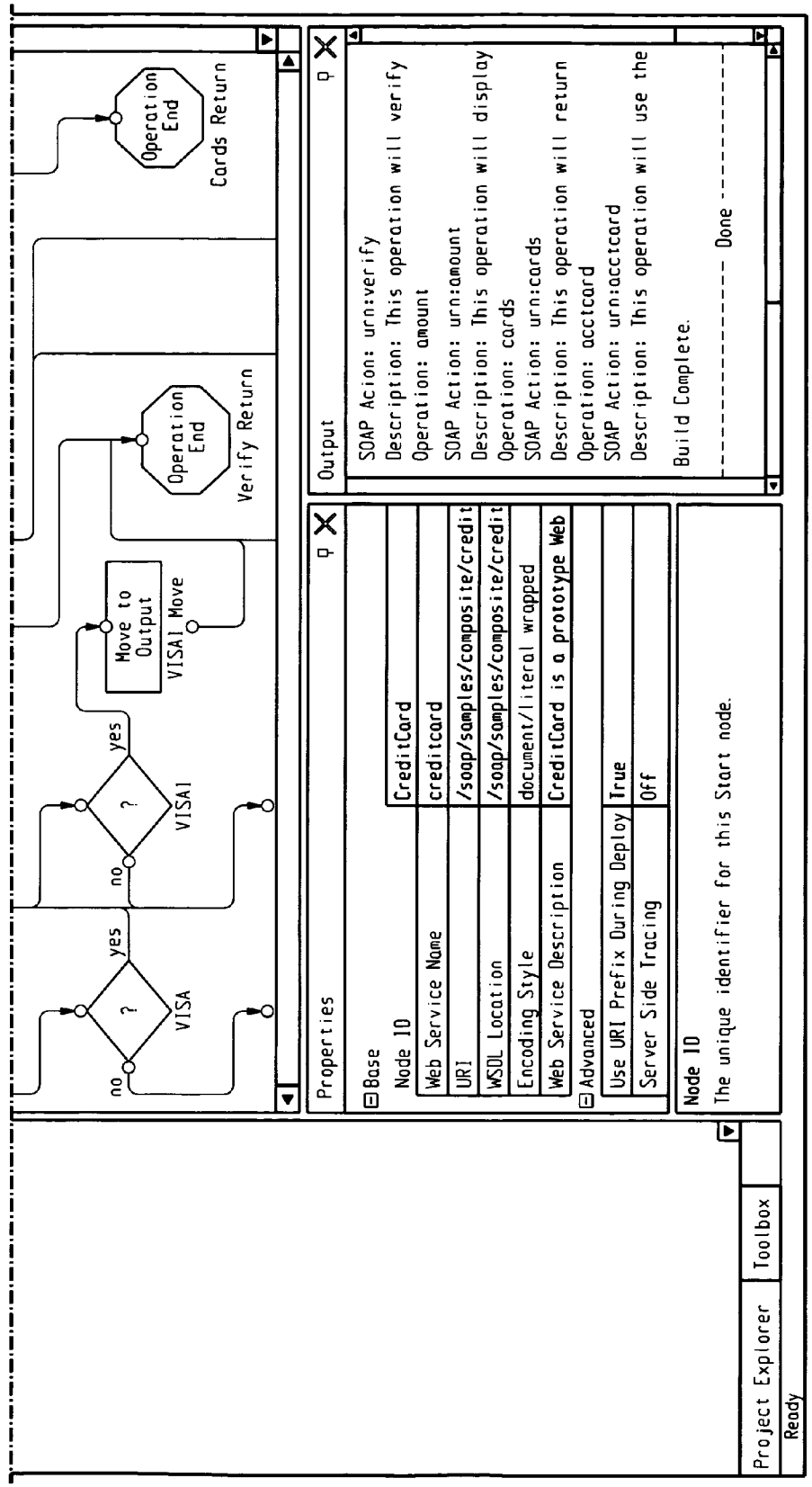

The following description lists some general features for an exemplary modeler or studio that may be used along with a manager or server function to provide application flow processing and orchestration of applications. The modeler or studio function typically includes a high quality graphical display process to achieve the easy graphical building of application flow process. Icons and images are used to associate tasks and functions required to build or orchestrate an application or set of application flows. FIG. 13 depicts a sample screen of one example interface with features as more fully described below.

Multi-document window interface for controlling several containers of information in a single User Interface (UI).

Drag-and-drop dockable windows allow customization of the UI to match the clients or users preferences that support one or more features such as:
  View or hide a window within UI
  Resize a window within UI dynamically.
  Place a window in different location within UI dynamically.
  Tab between windows.
  Each window is provided with scroll bars so that the information within the window can be viewed using the scroll bars if needed.
  Remember the current user preference and configure the windows the same way next application start up.

Graphical toolbox of icons used to manage the various nodes required for building application flows and composite application processes.
  Under certain conditions, the particular nodes made inactive depending on the application types that a developer builds.
  The nodes will be placed in a logical order that a developer might be using. For an example, all COMMAREA related nodes are grouped together, placed in the order that they are typically used. All 3270 related nodes are grouped and placed in the order that they are typically used. All Web services related nodes are grouped and placed in the order that they are typically used.

The toolbar may be fully customizable to allow clients to place important or high use items on toolbars for easy access.

Action bar menus may be provided to allow processing of all functions, important or higher usage functions will be represented by icons to allow placement on the toolbar.

Import functions may be supported for the following:
  Copybooks and/or source code to pull in COMMAREA or IMS application layouts
  BMS macro importer to pull in 3270 meta data information—This may include other 3270 sources in the future.
  Pull copybooks and/or source code from input source including local computer file system and remote computer file system.

Profile dialogs for manager server deployment, UDDI client, FTP client and 3270 client application processing. Profiles include information needed to create and maintain a connection to a host process.

Profile dialogs for management of internal/external tooling, namely access to applications created outside the product. For UDDI processing the dialogs may describe the various methods for importing WSDL files created by other functions or by the tool itself.

Project Explorer or file management process to show files associated with the project or file member to store all the execution flow processing XML information, may allow double clicking to process options, or right-click to show menu of processing options.

The application flow window or diagram window may be part of an MDI interface that provides a customizable grid layout process to allow nodes to be dragged to the diagram processing area and dropped. The dropping or selection process may activate a property window (part of a customizable dockable window interface). Once activated the property window can display the default or saved options for each node depending on the state of activation.

Certain nodes may provide collections of information about meta data or data movements. The collections may be accessible via a mouse click or keyboard selection of the collection expansion process. The collections may be presented in tree processing dialogs to allow for ease of processing when selecting or building meta data information.

The graphical Diagram window may contain rule processing to allow the flow engine to process correctly. A rigid and expansive set of ruling and verification may take place each time a node or tool is connected or disconnected to reduce errors. The flow processing may require validation in some implementations before a connection is allowed; this provides the client with immediate feedback as to the validity of the diagram, model or application flow. When meta data items are renamed or moved in the collection properties the change should be propagated through all nodes attached to the project.

The Properties window may display the required meta data information when a node is selected. When it is required, each meta data may cause additional windows to gather information. As an example, Web Service Client Point Node needs the WSDL location of the Web service. When the WSDL location is clicked, WSDL Discovery window is displayed so that it can gather information about the WSDL and populate the required information on the property window.

When the project is deployed to the manager or server, the status of build, verification or processing rules, and the status of upload process of processing rules of application and generated WSDL may be displayed.

In addition, some implementations include a build or verification process that can provide a secondary check of the properties and connections between the nodes to insure the flow processing rules are complete and valid before being deployed (uploaded) to the manager/server process.

After the completion of the build process, the generated files (e.g., WSDL files, rules processing files, HTML files) describing the application flow are stored. In some implementations, they are stored in the same directory structure of the computer system's file system.

A test utility window may contain areas to view and change WSDL location, operation name, URI location, HTTP version, timeout value, user ID, password, SOAP Request parameters, execution of the request, and/or display of the test result /SOAP Response. The interface in some implementations may include one or more of the following features:

- Remember the current project information from the graphical Diagram window and pre-fill the information including WSDL and URI locations, operation name, and HTTP version.
- Understand the current project information including the list of operations, the SOAP request and SOAP response parameters.
- Allow test data to be entered
- Save test data and reuse the saved test data.
- View host-generated traces in a window.

A full help processing system may be provided in some implementations with the system to provide details on usage and processing of the various functions.

The following is a list of potential nodes in this exemplary implementation and a short description of its function:

- Start—project or flow starting point: contains URI, WSDL location, descriptions and encoding styles and various other information for the rules processing engine. It also defines the name of the Web service.
- Web Service Operation (WSO)—contains the collections for SOAP input/output and work field processing, defines the operation name for the web service defined in the start node. Allowing multi-operations is a significant feature for the mainframe application based version of the described systems and methods.
- Callable Service Operation (CSO)—contains the collections for building an API layout to allow client applications to call the server/manager for processing rules based functions via application code instead of via SOAP based calls to activate composite SOAP applications.
- 3270 Process—defines the 3270 BMS transaction codes and parameters needed to execute a transaction; this may contain processing of any 3270 application screen and need not be restricted to BMS only. After a process node there is normally a 3270 Point node as there is an implied 3270 action after the rules processing of the manager flows through a 3270 Process node.
- 3270 Point—defines the map information for the 3270 process so that the correct meta data information is used for the following movement processing.
- Move to 3270—collections of movements of data using meta data information from any previously access information.
- 3270 Action—the action node defines the 3270 AID or key that should be pressed at the current time. After an action, another 3270 action or a collection of 3270 Point nodes are typically seen. The rules engine internally processes logic flow decisions to select the correct 3270 Point node based on the 3270 image or map that is currently active for the process. After each 3270 action, any number of different screen display options may be provided.
- LINK Point Node—contains information to process a direct application call via CICS, IMS or other application platforms accessed via call or flat meta data layouts. Another feature is the ability to process several referenced storage areas in addition to just the single flat storage data area. This referenced storage process provides a method to pass very large data areas based on pointer or address reference points, similar to container or channel processing used by CICS TS 3.1. The meta data API area can be one single area or several areas.
- Move to LINK—this is used as the collection point for movements of meta data from all previously referenced storage to the API area used to communicate to the application. Previous storage could be SOAP input, other applications called via LINK Point, 3270 Point or Web Service Client Point Nodes. The processes described herein may optimize the processing of storage based in part on the rules processor's knowledge at design time of all the data that may be moved or modified.
- Execute Link Point Node—this node is mainly a marker in the logic flow of the diagram to show when the process is actually called. It allows for easy identification of the application flow being processed.
- Web Service Client Point Node—identifies the processing of external Web service functions, they could be other Web services created by the present systems and methods or Web services created by other automated or manual methods. The process may provide an import function at this node to collect WSDL files for building the SOAP client needed to access the process. The process may build this dynamically via the modeler and creates a static call in the rules engine on the manager/server that will process the dynamic input and output for the referenced Web service operation. Special usage work variables can be processed as any object property, for example using the @@fieldname; option. This process allows any static option to be modified at runtime by the contents of the named work field.
- Move to Web Service Client—this movement is like all other movement nodes with the exception that a WSDL is used to define the field names required for the operation.

Execute Web Service Client—this node marks when the requested call is placed by the manager/server rules processing engine. The SOAP client is dynamically built at runtime to process the Web service operation.

Move to Output—this node may be executed as many times as needed to move the entire SOAP packet to the requester. The client has control over when and where these are placed in the diagram flow, as stated only one is needed, but as many as required may be coded. Any application data collected in the application flow (continuous connection points) is available to be moved to the SOAP Output, or API communication area depending on the type of service created.

Move to Work Variable—as discussed, work variables are meta data fields used to store information that can be used in the product runtime options or as storage for data that may or may not be needed for processing the application, for example switches to modify logic flow in a set of rules in a diagram.

Connector—connectors do just what the name implies, as decisions are used to create branches in the logic flow the connector can be used to bring many nodes into a single logic flow again. There are fewer rules about the placement of Connector nodes than any other node. In a preferred implementation, the connector cannot be used to join different operations in a project; it can only connect branches of an operation back to the same operation.

Decision—the logic flow modifier, clients can check work fields, SOAP input, application data from any of the various point nodes or for checking the ranges of boundary of arrays. The systems and methods described herein may support an array processor approach that allows for dynamic array processing for SOAP operations. Application arrays are normally static in nature, but can be processed using the same array boundary checking as for SOAP fields.

Loop—the rule execution flow processor may have the ability to loop through applications (calling repetitively) to process large amounts of information. The node has controls to limit loop processing to a defined amount or allow for decision processing to control the loop functions. Loops can also be used to process arrays of data in SOAP or application meta data.

Operation End—signals to the rules engine that all the processing that has taken place to this point is complete and the response should be returned. If the SOAP Fault option is turned on, the Operation End will create a SOAP fault that will be returned to the calling SOAP client; this is normally used for error processing, but could also signal to the calling application the process completed Sticky Note—used to add documentation to the logic flow diagram, this is only informational data and is not used by the rules engine.

Tool Box Window of One Exemplary Modeler or Studio Function

Figure 14:
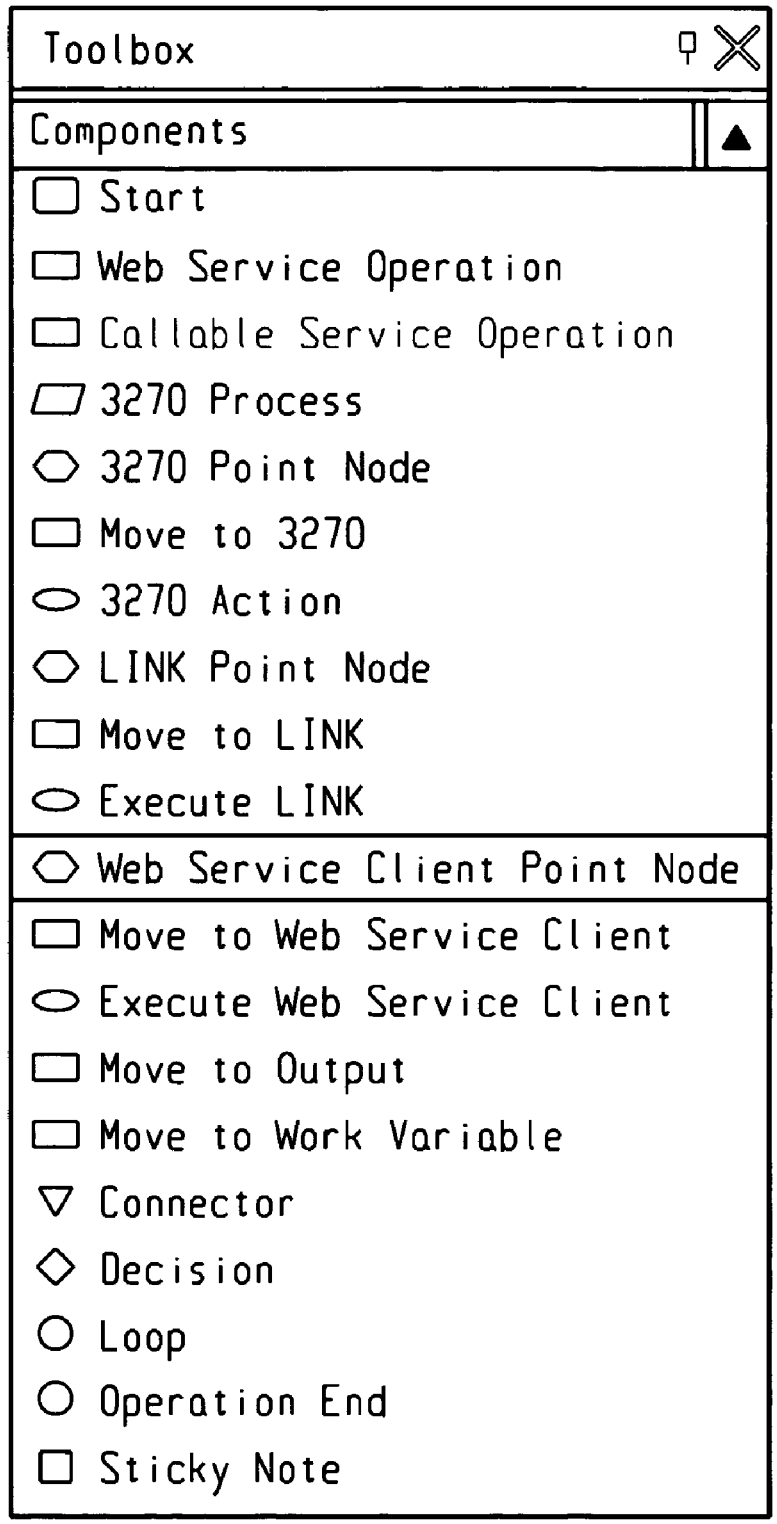
FIG. 14 depicts a potential tool box window of an exemplary modeler.

A graphical toolbox of icons may be used to manage the various nodes for building application flows and composite application processes. Such an exemplary interface is depicted in FIG. 14.

When a node is depressed or selected, it can be dragged and dropped on a Diagram window.

In some implementations, the graphical toolbox can be context sensitive. Particular node types can be made inactive depending on the application type that a developer builds. As an example, FIG. 14 shows that Callable Service Operation node is made inactive because the developer is not building a Callable service application.

The nodes are preferably placed in a logical order.

All applications typically start with a Start node followed by one or more Web Services Operation nodes, and end with one or more Stop nodes. Therefore, the Toolbox window may start with the Start node followed by various operational nodes including the Web Services Operation node and Callable Service Operation node.

All 3270 related nodes may be placed in a logical order and grouped together. For example, the 3270 Process, 3270 Point Node, Move to 3270, 3270 Action are ordered and grouped accordingly.

All LINK related nodes may be ordered logically and grouped together. For example, the LINK Point Node, Move to LINK, and Execute LINK nodes are ordered and grouped accordingly.

All Web Services related nodes may be placed in a logical order and grouped together. For example, the Web Service Client Point Node, Move to Web Service Client, and Execute Web Service Client nodes are ordered and grouped accordingly.

After executing an operation node (3270 Action, Execute LINK, or Execute Web Service Client), the resultant data from the operation is available. Using the available data, the data can be moved, checked and/or a decision is made to loop or connect to other logical place, and/or loop. Therefore, Move to Output, Move to Work Variable, Connector, Decision, and Loop nodes may be placed after the last execute node and grouped together.

Since the last logical operation is typically the Operation End node, it may be listed as the last item of the logical operation node.

Since the Sticky Note is typically used as a documentation tool, it may also be placed after the last logical operation node Operation End node.

| Component | Description |
| --- | --- |
| 3270 Action | Defines the AID operation that is required to continue (move to the next screen). |
| 3270 Point Node | Identifies the BMS mapset and map name available to lower level nodes. |
| 3270 Process | Defines the data and operations required for a 3270 Bridge process. Server will process the data collected by this node to invoke the 3270 transaction and start the data collection or processing actions that follow. |
| Callable Service Operation | Identifies inputs, outputs and work variables for the Callable service. |

-continued

| Component | Description |
| --- | --- |
| Connector | Provides the means to return to the main flow path after branching into multiple paths. The connector eliminates the need for complex or redundant tree structures.<br>Note: Every connection into a Connector must originate from the same nearest parent point node. |
| Decision | Allows you to make comparisons between data values from point nodes, SOAP inputs, work variables, or static text. |
| Execute LINK | Performs the LINK to the program defined in the previous LINK Point Node, using the data that has been passed in the COMMAREA with one or more Move to LINK nodes. |
| Execute Web Service Client | Calls the Web service operation defined in the Web Service Client Point Node.<br>Following this node, you can use the SOAP outputs of the Web Service Client Point Node as data sources for any subsequent movements or decisions. |
| LINK Point Node | Defines the CICS application program, as well as the input and output copybooks for the current operation. |
| Loop | Defines a point in the Web service operation where a loop must occur to collect all the required information. |
| Move to 3270 | Defines the movement of data to the nearest parent 3270 point node (BMS map) from valid data sources, including 3270 field, copybook field, SOAP input, work variable, or static text. |
| Move to COMMAREA | Defines the movement of data to the COMMAREA associated with the input copybook in the nearest parent LINK Point Node from valid data sources, including 3270 field, copybook field, SOAP input, work variable, or static text. |
| Move to Output | Defines the movement of data to a SOAP output (defined in the parent Web Service Operation node) from valid data sources, including the nearest parent point node, work variable, or static text. |
| Move to Web Service Client | Defines the movement of data (defined in the parent Web Service Operation node) to the SOAP inputs of the Web Service Client Point Node. |
| Move to Work Variable | Provides the ability to assign values to work variables that have been defined in the parent Web Service Operation node. This allows you to store information for later use in a Decision node or other movement node. |
| Operation End | Signals the end of the Web service operation. |
| Start | Marks the beginning of the diagram and identifies the URI of the Web service operation. |
| Sticky Note | Allows you to add comments to the diagram to make it more understandable; it does not perform any processing or data collection. |
| Web Service Client Point Node | Allows you to browse the Web for a WSDL document, which defines the available services and operations as well as the SOAP inputs and outputs for each operation. After you select a WSDL, you select the Web service and Web service operation you want to call. |
| Web Services | Defines a single operation within the Web service. There can be one or more Web service operations connected to the Start node in each Ivory project. This node also defines the SOAP inputs, SOAP outputs, and work variables for this operation. |

Project Explorer Window of One Exemplary Modeler or Studio Function

Figure 15:
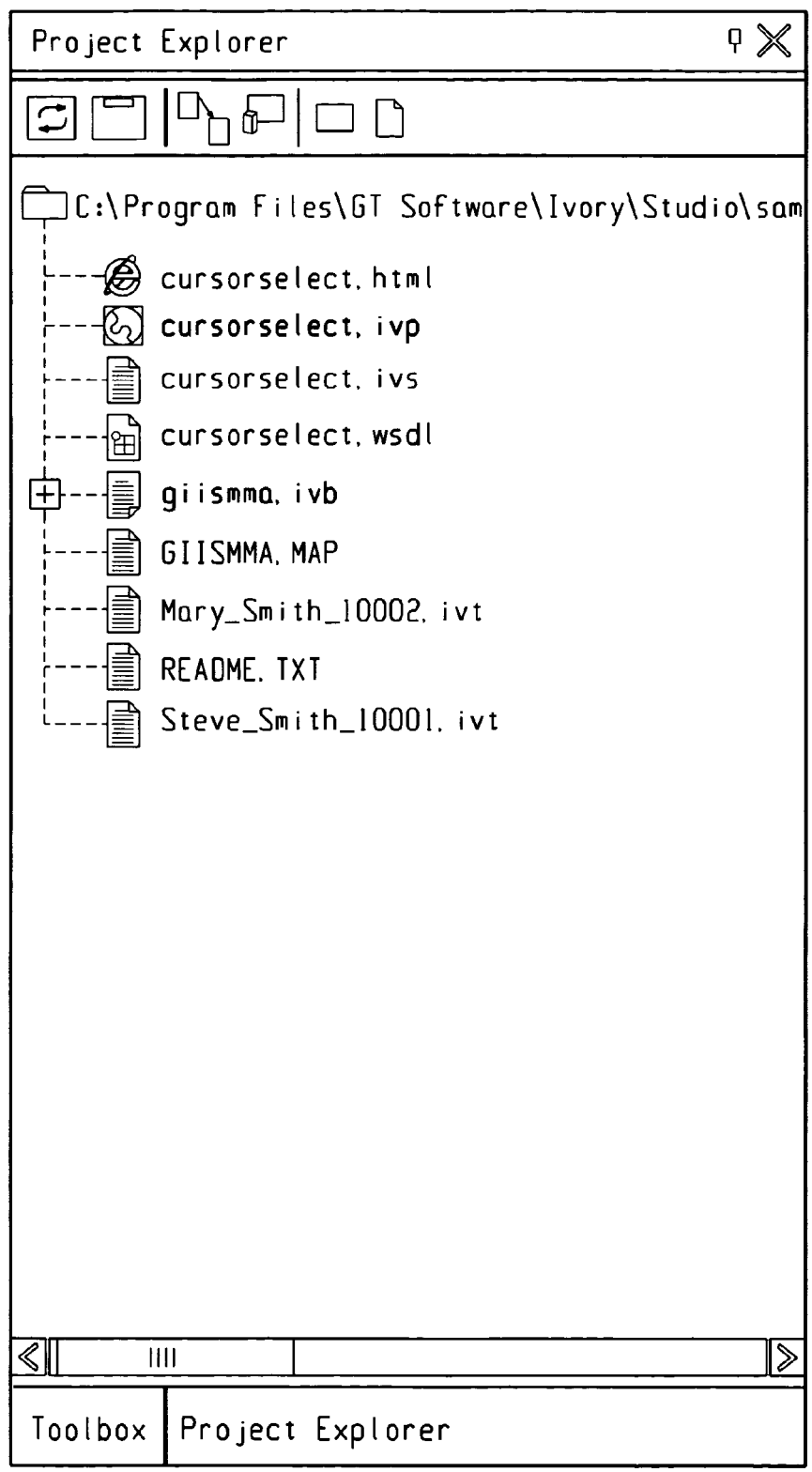
FIG. 15 depicts a potential project explorer window of an exemplary modeler.

Some implementations may include a project explorer window that may be dockable within an MDI environment. An exemplary project explorer window is depicted in FIG. 15. Project Explorer may display the contents of the project folder. When a project is created, a folder is specified where the project will reside. This folder may contain files that are not included in the studio project as explained below.

In some implementations such as depicted in FIG. 15, files that are included in the project appear in bold type, and files that are not included appear in normal type.

When a file is "included" in a studio project, the file is available to be associated with a point node in the diagram. Being included in the project does not necessarily mean that the file is (or will be) used by the project.

"Included" files may be used to define project information that is external to modeler or studio, such as BMS mapsets and/or COBOL copybooks. When a developer imports a mapset or copybook, it can be automatically included in the currently open project.

Various features of preferred implementations are outlined as follows:
  Allow manual inclusion of mapset and copybook files that have been copied into the project folder. In some implementations, the interface supports inclusion of a file through a right-click context menu.
  View the file content by double-clicking in a separate modeler or studio display window.
  Allow view of the 3270 map image if a map is clicked in a separate modeler or studio 3270 Emulator window.

Properties Window of One Exemplary Modeler or Studio Function

Figure 16:
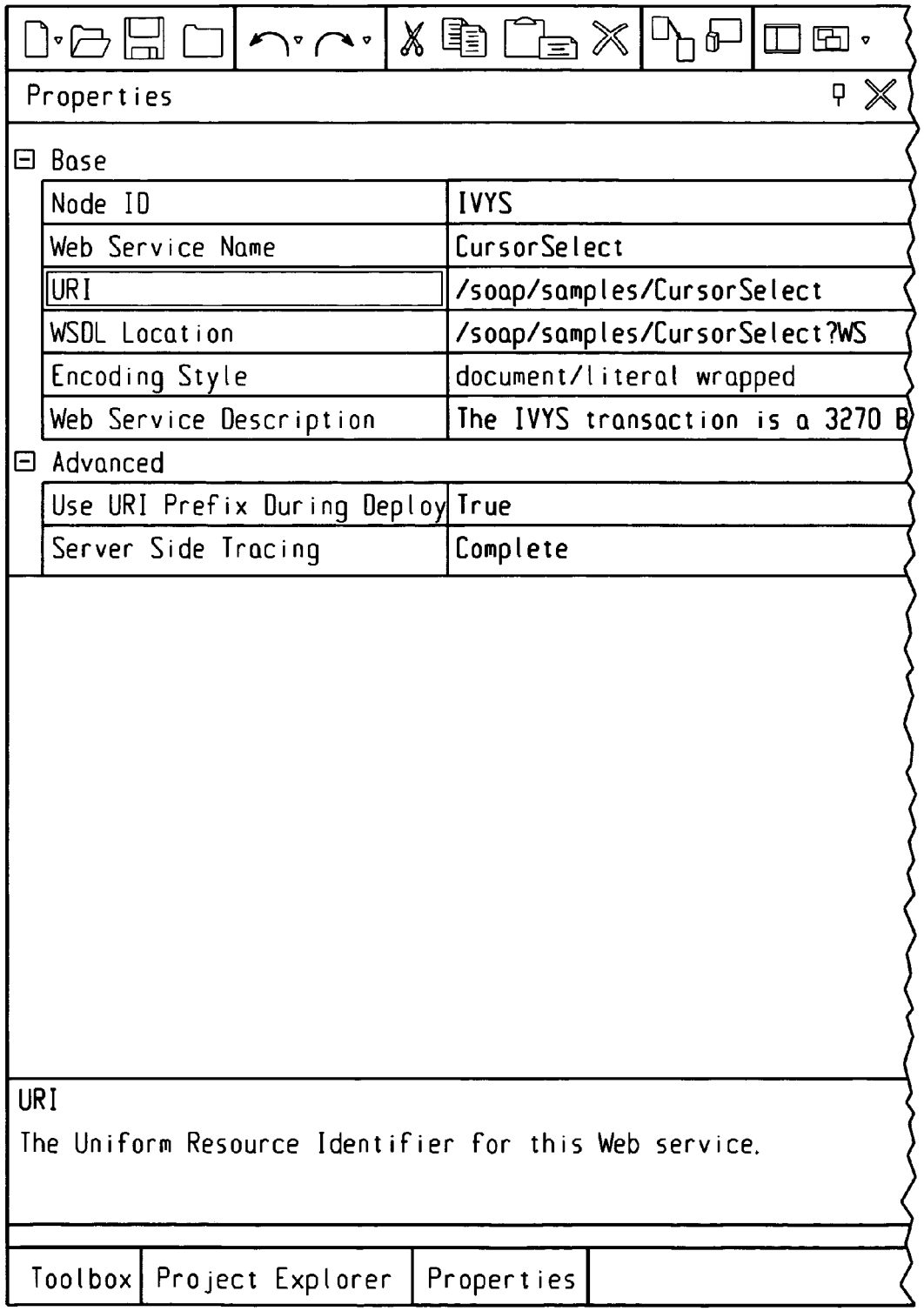
FIG. 16 depicts a potential property window of an exemplary modeler.

Various implementations may further provide a Property interface. One exemplary interface is depicted in FIG. 16 and described further below.

The Properties window in such implementations may display the required meta data information for a selected node. The operation of this exemplary interface is outlined as follows:

- Once a node is activated, such as from a Diagram window as detailed below, the property window will display the default or saved options for each node depending on the state of activation.
- The meta data required for the node is displayed. For an example, the Start node will require the node ID, Web services name, URI, WSDL location, encoding style, description, use URI prefix option, and server side tracing option.
- When a particular meta data item is selected, the help information is displayed so that a developer knows what to do.
- When required, each meta data may cause additional windows to be displayed to aid gather information. As an example, Web Service Client Point Node needs the WSDL location of the Web service. When the WSDL location is clicked, WSDL Discovery window is displayed so that it can gather information about the WSDL and populate the required information on the property window.
- When required, each meta data may list the options that a developer can choose from. For an example, in a Start node, the Use URI Prefix During Deploy will list True or False options when selected.

Diagram Window of One Exemplary Modeler or Studio

Figure 17A:
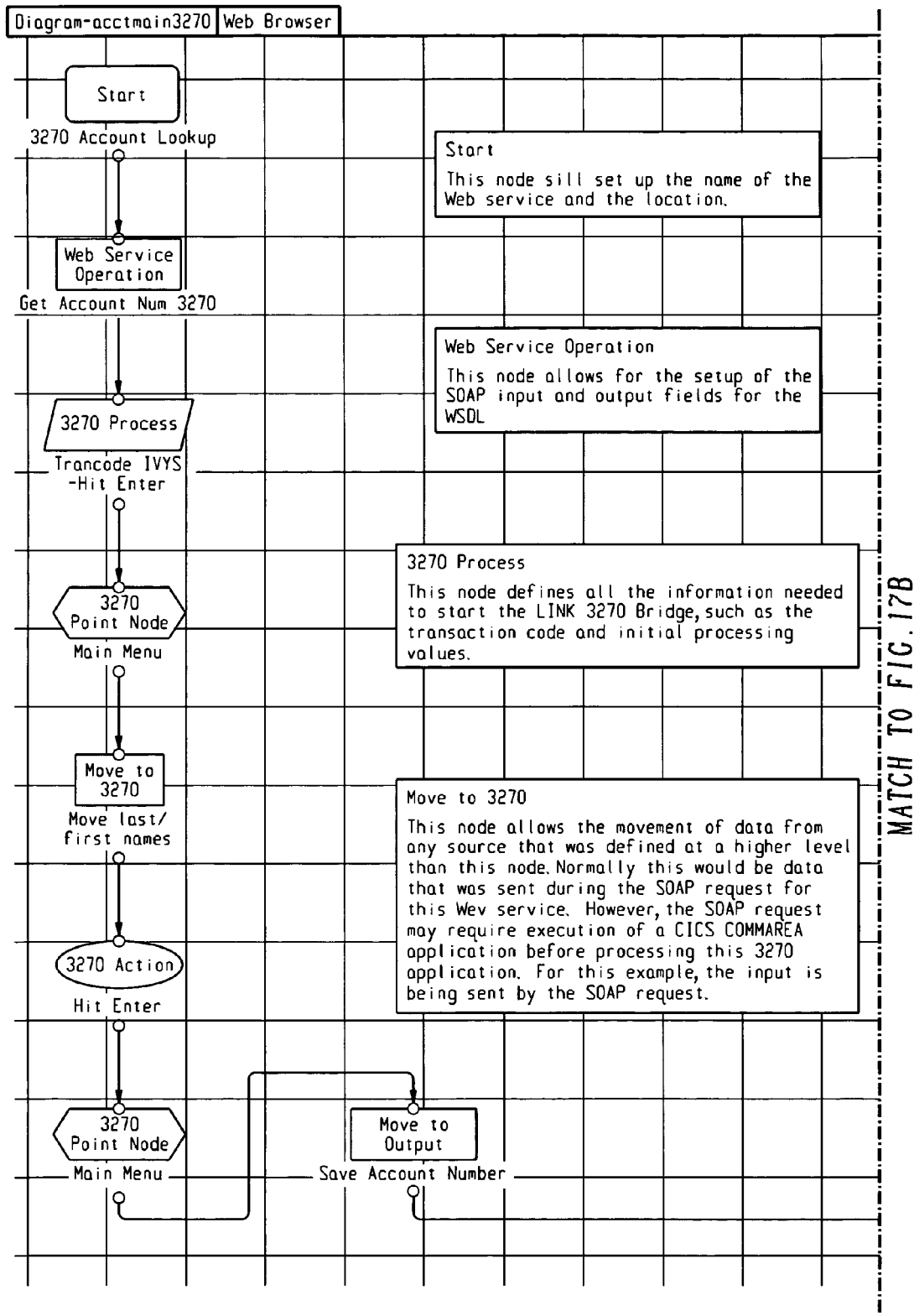
FIG. 17 provides a graphical representation of an example graphical diagram window.
Figure 17B:
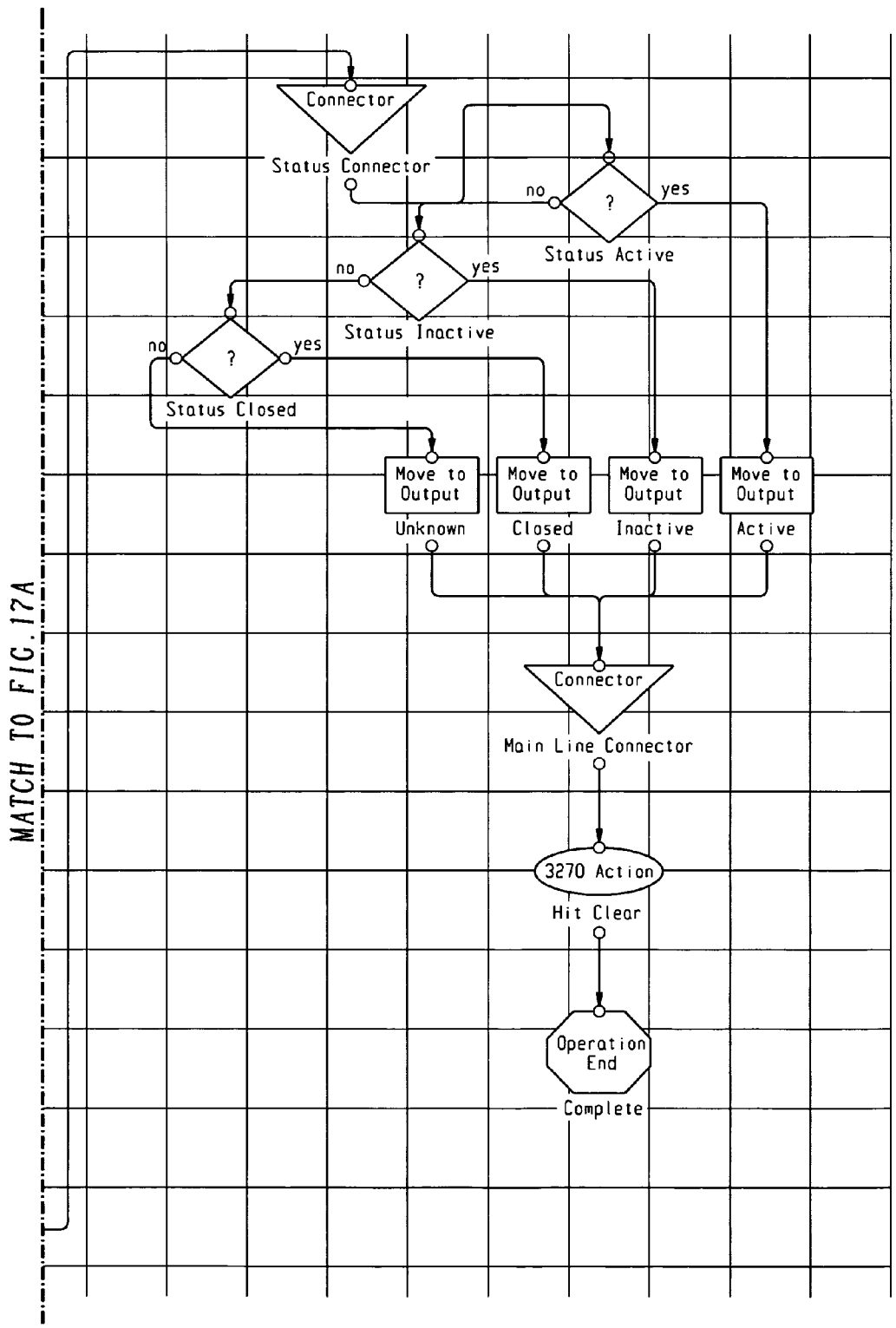

Some implementations may include a Diagram window that may also be referred to as an application flow window. Such a Diagram window may be included as part of an MDI interface. An exemplary diagram window is depicted in FIG. 17. Such an exemplary interface may include one or more of the following features.

- A customizable grid layout process to allow nodes to be dragged to the diagram processing area and dropped from the Toolbox window.
- The dropping or selection process will activate a Properties window. Once activated the properties window will display the default or saved options for each node depending on the state of activation.
- A grid to allow proper alignment of diagram or graphical representation of a application.
- A zooming capability to be able to resize the diagrams in 25, 50, 75, 100, and 200% of normal diagram size.
- A copy and paste function to be able to duplicate the area of logic in other locations in the application flow or to be able to duplicate in other application flow or project.
- An ability to move a diagram node or group of diagrams to anywhere in a canvas area.
- An ability to flip connection points when right mouse is clicked on a node and select on the option. For an example, the typical Decision node connections are to have the YES connector on right side of the Decision node and NO connector on the left side of the Decision node. When a decision node is selected and right mouse is clicked, it will display an option to flip nodes. If the flip node is activated, the YES and NO will be reversed.
- When an application flow or project is saved reopened, the diagrams on the window should displayed as it was when it was saved.

Browser Window of One Exemplary Modeler or Studio

Figure 18:
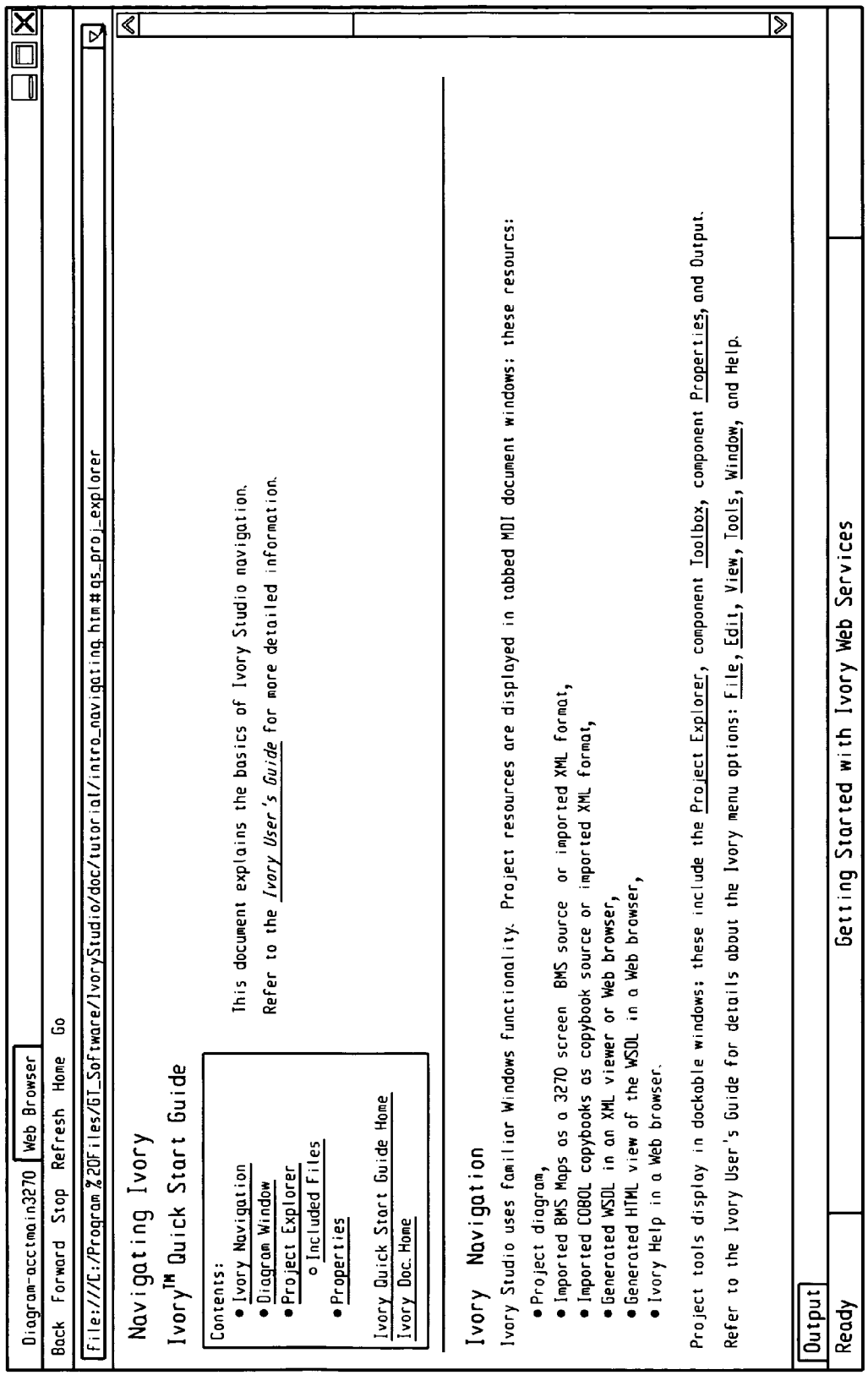
FIG. 18 represents a browser window within exemplary modeler.

Some implementations may include a Browser window. An example of which is presented in FIG. 18. The Browser window may be included as part of the MDI or be launched separately. The Browser window can display any documents including Internet site and text document. Such an interface may provide one or more of the following features:

- Go back to display the previously displayed information.
- Go forward to display the next information (previously displayed information).
- The same functionality as the commercially available Internet browsers like Microsoft Internet ExplorerBrowser including ability to display any Internet documents.
- When View Trace is selected from the Test Utility window, display the trace information by downloading trace information from the manager or server.

Exemplary Test Utility Window

Figure 19:
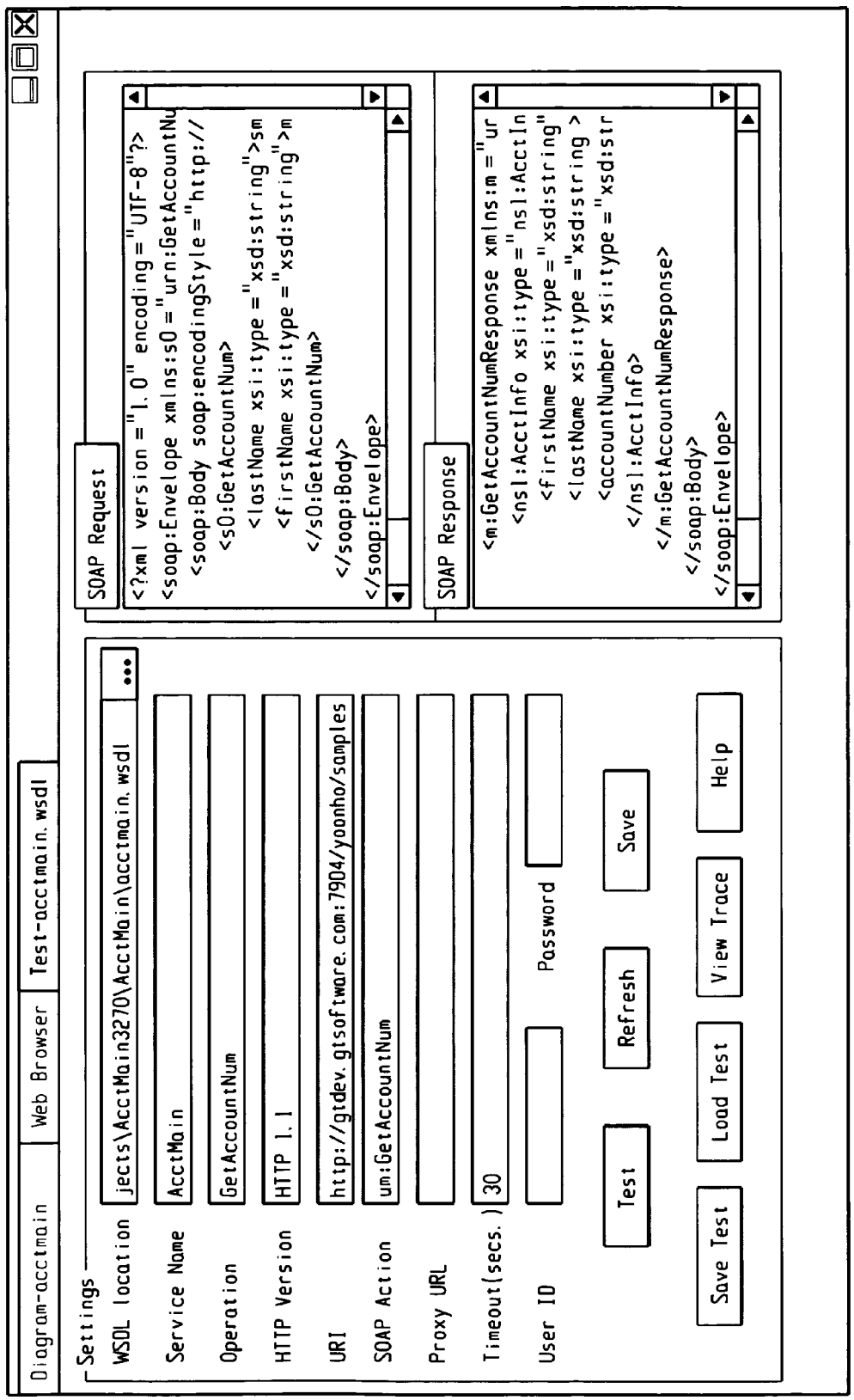
FIG. 19 depicts an exemplary test window.
Figure 20:
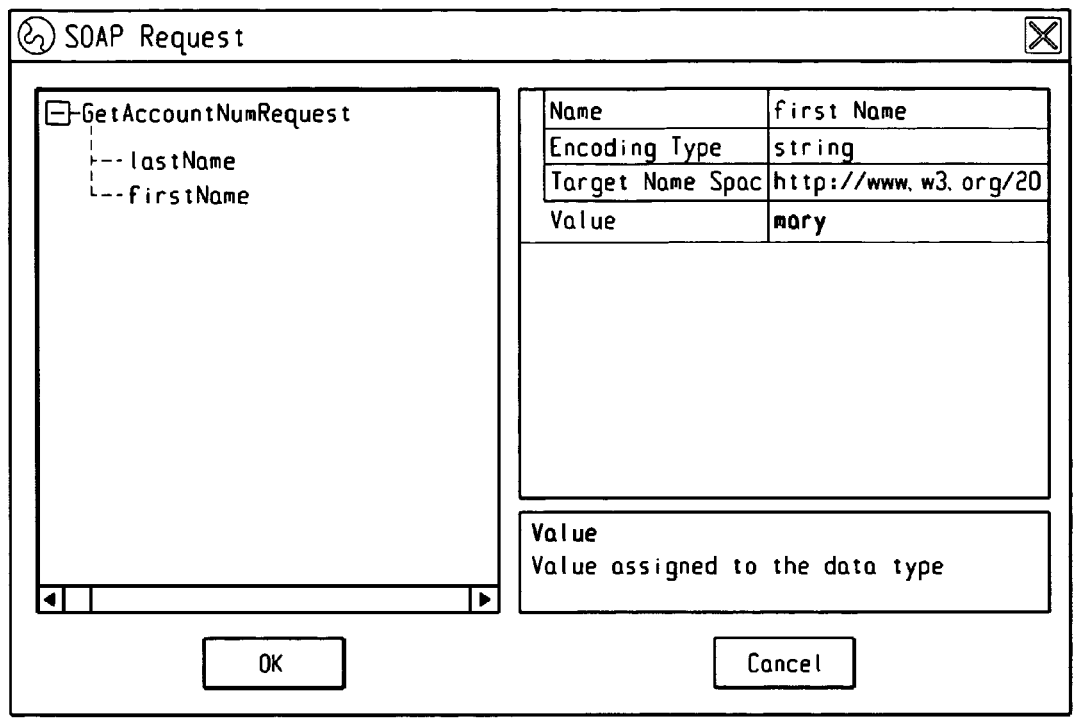
FIG. 20 depicts an exemplary SOAP request window as used by the exemplary test window of FIG. 19.
Figure 21:
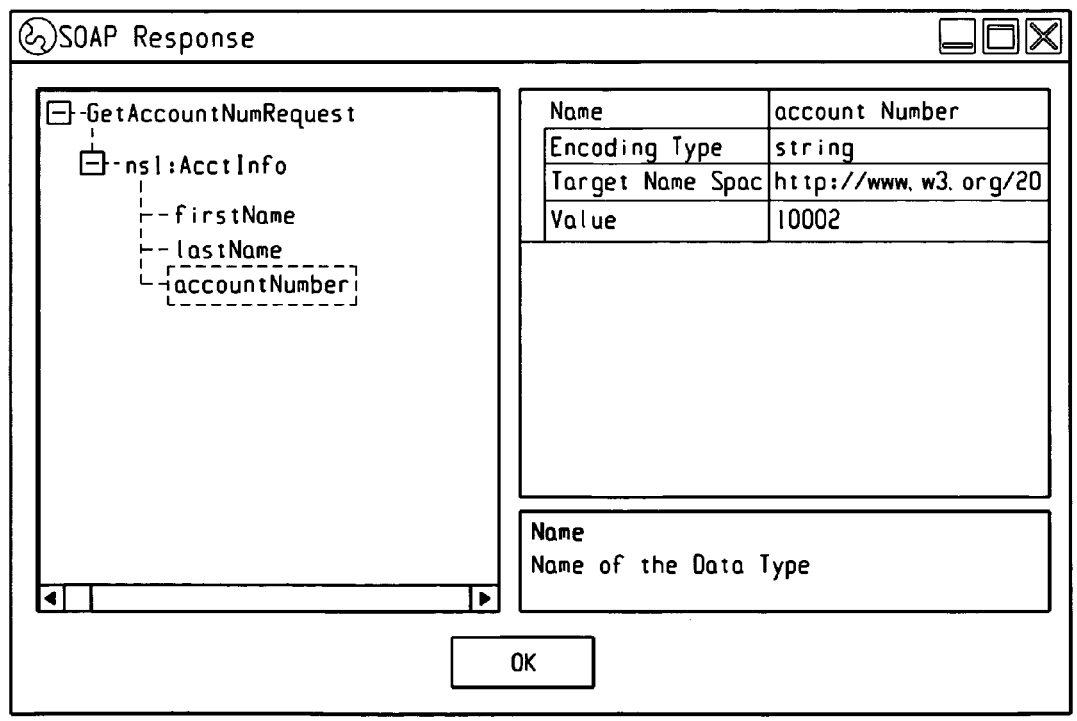
FIG. 21 depicts an exemplary SOAP response window used by the exemplary test window of FIG. 19.

Some implementations may provide a Test Utility that can allow the unit testing of Web Services which are to be deployed to the manager or server. An exemplary interface is provided in FIG. 19. Such a test utility window may support one or more of the following features:

- View and change WSDL location, service name, service operation, HTTP version, URI, and SOAP Action.
- Remember the current project information from the graphical Diagram window and pre-fill the information including URI.
- Access the WSDL specified in the WSDL location and populate the information like service name, service operation, HTTP version, URI, and SOAP Action.
- Select a service operation from list of operations that the WSDL supports.
- Select an HTTP version from the list of HTTP versions that the WSDL supports.
- Set Proxy URI.
- Set Timeout value so that the execution will stop after a certain time.
- Set user ID and password for security checking if security is activated on the server or manger.
- Execution of test by sending SOAP request parameters.
- Save test data and reuse saved test data at a later time.
- Loading of test data from a local or remote files system to be used in the test.
- View host generated traces in Browser window.
- View generated SOAP Request parameters.
  - Access the WSDL and parse the WSDL to find required SOAP Request parameters.
  - Generate and display the SOAP request parameters so that the tester can enter data. An example of these parameters is depicted in FIG. 20.
- View received SOAP response from the server or manager
  - Parse the WSDL to determine the SOAP Response parameters.
  - Generate and display the SOAP response parameters so that the tester can view returned data. An example of these parameters is depicted in FIG. 21.

Exemplary Modeler Output Window

Some implementations may support an Output window. The Output window may be a dockable window supported in an overall MDI. FIG. 22 depicts an example Output window. An output window may support one or more of the following features:
- When the project or application flow is built, the status of the build process is displayed. If there is any error during the build process, the error is displayed on this window to allow the debugging of the logic.
- When the project or application flow is deployed to the manager or server, the status of build, verification or processing rules, and the status of upload process of processing rules of application and generated WSDL to be displayed.

Example Web Service Development Using One Exemplary Modeler or Studio

As an example, the development of a 3270 CICS application that searches for a name (first and last name) and displays information about the account including the account number, address, status, and account limit is described. Using this information, the 3270 operator, a helpdesk, could raise the account limit if the account status is active, or reopen the account if it is closed.

Figure 23:
FIG. 23 depicts a screen from mainframe sample application.

Similar programs have existed for decades in the mainframe environment. Those mainframe programs developed over many years cannot be replaced overnight, even though they may be cumbersome to use. For example, the following procedure outlines what a 3270 operator would typically do to find account information using a mainframe application:
- From a 3270 terminal, the 3270 operator types the transaction code "IVYS" on a blank 3270 screen and presses the Enter key.
- The program called by the IVYS transaction runs and displays a blank screen such as depicted in FIG. 23.
- Then the 3270 operator types the last name and first name of an account holder on the screen and presses the Enter-key.
- The program runs and displays account information, such as presented in FIG. 24.
- The 3270 operator reads the displayed information and saves it by either writing notes or printing the screen.
- The 3270 operator studies the displayed information, for example to determine the account status. Based on that information, the 3270 operator performs a different task.

This is an example of a simple task, but it requires multiple 3270 operations to accomplish the task. In order to save this information, or to share it with other computer platforms, such as a PC, the saving or sharing must be performed manually. However, if this operation is converted to a Web service, this information can be shared with other platform computers and other applications.

In many cases, the people who wrote the decades-old mainframe applications are no longer available. Consequently, it is not easy or cost-effective to alter the original application program.

Figure 25:
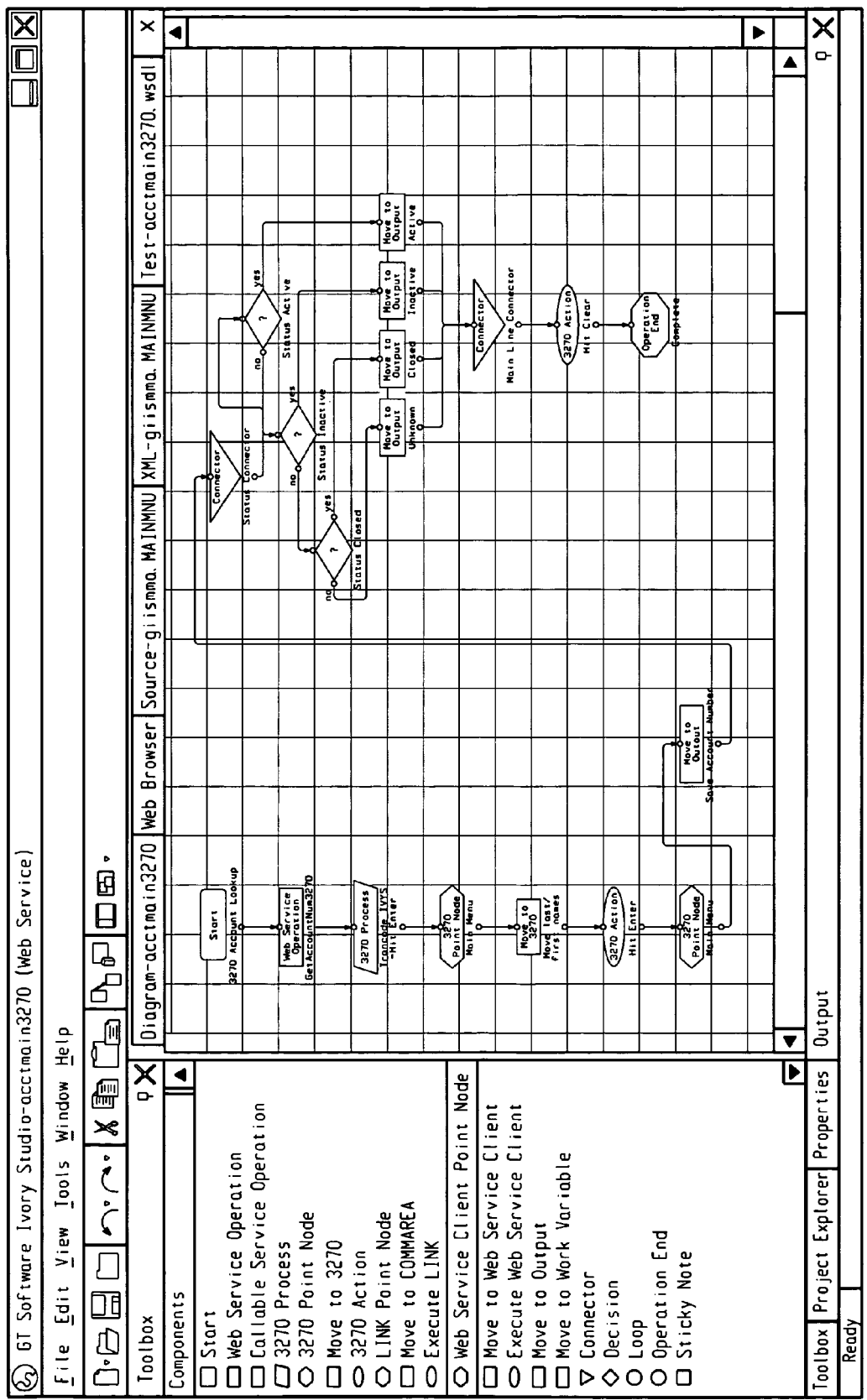
FIG. 25 depicts an exemplary modeler project representing a Web service to operate a mainframe application defined through graphical nodes.

Using the modeler or server, the existing program and business process can be converted to a Web service through a graphical definition, and no changes to the original program are required. An exemplary graphical flow for this process is depicted in FIG. 25.

The graphical diagram defines a Web service which represents the application or business process that the 3270 operator had to perform manually:
- Typing the "IVYS" transaction ID and pressing the Enter key.
- When a 3270 map is displayed, typing the account holders last name and first name, and pressing the Enter key.
- When the response is displayed, reviewing the information to determine the next action.

Figure 26:
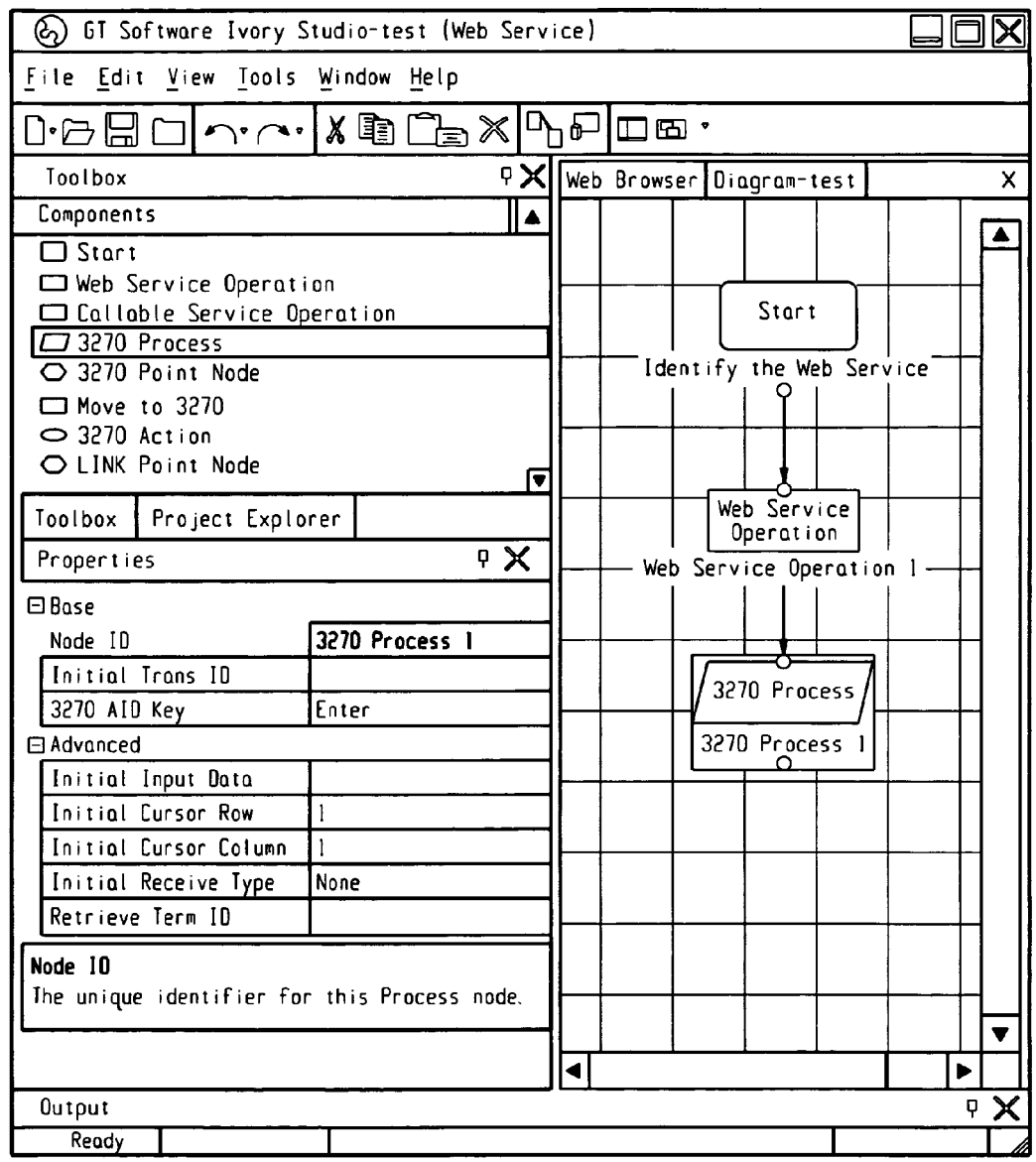
FIG. 26 demonstrates the relationship between a property window and a node within an graphical diagram window in a particular example modeler.

In order to convert the sample application into a Web service, a developer drags a node from the Toolbox window and drops the node on the Diagram window. When the node is selected on the Diagram window, the Properties window displays current and default information about the node, which is modified by the developer to provide the information needed by the application. An exemplary interface is depicted in FIG. 26.

First, describe the Web service environment.
- The Start node provides the name of the Web service, the location of the WSDL, URI, encoding style and its description.
- The Web Service Operation node provides the name of the operation, SOAP input and output parameters, and describes the operation or business process that it will perform below this node. It is possible for a single Web service to have multiple Web service operations. Using our example, the SOAP input parameters will be the last name and first name of the account holder. The SOAP output parameters will be the account number and the account status (Active, Closed, Inactive, or unknown).

Next, the developer begins to diagram the flow of the operation.
- With the old mainframe application, the 3270 operator typed the "IVYS" transaction code on a 3270 screen and pressed the Enter key to begin. To mimic this action in the Web service, the developer drags a 3270 Process node to the Diagram window. In the Properties window for the node, the developer enters the IVYS initial transaction code and defines "Enter" as the 3270 AID key. This replaces the user action of typing the transaction code and pressing Enter.
- As a result of pressing the Enter key on the mainframe application, a 3270 screen was displayed. To produce this result, the developer drags a 3270 Point node onto the Diagram window. In the Properties window, the developer identifies the name of the mapset and map that it should expect to receive.
- When the 3270 mainframe screen was displayed, the 3270 operator would type the last name and first name of the account holder. The developer now drags a Move to 3270 node onto the Diagram window. The Move to 3270 node allows the movement of data from any source that was defined at a higher level than this node. The possible data source is described below. In the example, the developer will use the SOAP input to move the account number, and Static Text to set the "demographic" option. A drop-down menu such as seen in FIG. 27 could be used to specify this.
- After entering the name, the 3270 operator pressed the Enter key. To duplicate this manual operation, the developer drags a 3270 Action node to the Diagram window.
- After the 3270 operator pressed the Enter key, the 3270 map with the account number information was displayed. To provide the same function, the developer drags a 3270 Point Node to the Diagram window. The node properties in the Properties window describe the expected 3270 mapset, and map name to receive.
- When the information was displayed, the 3270 operator had to read the information on the 3270 screen and validate the account number. In the Web service diagram, the developer does the same by dragging a Move to Output node to the Diagram window, saving the account number information. The Move to Output node allows the data movement to SOAP output parameters from any data source that was referenced prior to this node. In this example, the developer will pull the information from the 3270 field and save or move the account number to the SOAP output field. The use of the 3270 field can be selected via a pull-down menu such as presented in FIG. 28.

Next, the 3270 operator determines whether the account is Active, Inactive, Closed, or Unknown (error). Based on the status of the account, the 3270 operator will perform different operations. The Web service uses a series of Decision nodes to check the account status. Each Decision node allows checking a value against a data source. Based on the result of the check, it will generate a YES or NO answer. The first Decision node will check whether the account is Active. If the answer is YES, it will move information to the SOAP output area indicating that this account is an active account. If the answer is NO, then the next Decision node is checked for Inactive status, and so on. Typical use of a Decision node is to direct flow of Web service logic and to find errors, end a process, or select the next operation. The Decision node can check whether any data was returned from the name look-up function. Then, based on the reply, it will build a different reply buffer. A Move to Output node is used to define data fields that will be returned in the SOAP response. Any data previously collected can be marked as information to be included in the SOAP reply.

The WSDL output fields are the typical method to return data to the requesting application. Notice that not all of the information available on the 3270 screen was of interest to the 3270 operator. Therefore, Web service developer provided only the data required by the operation. This reduces the storage requirement during processing and data transfer between machines reducing the network traffic requirements.

The series of manual operations that were required to gather simple account information was automated without writing a single line of code. The automation was done using the graphical representation of the 3270 operator's operations.

What if the 3270 operator needed to raise the credit limit, perform other tasks based on the account information. The 3270 operator would have to go through another series of manual operations. This process can also be automated through a Web service developed using the modeler or studio.

Figure 29A:
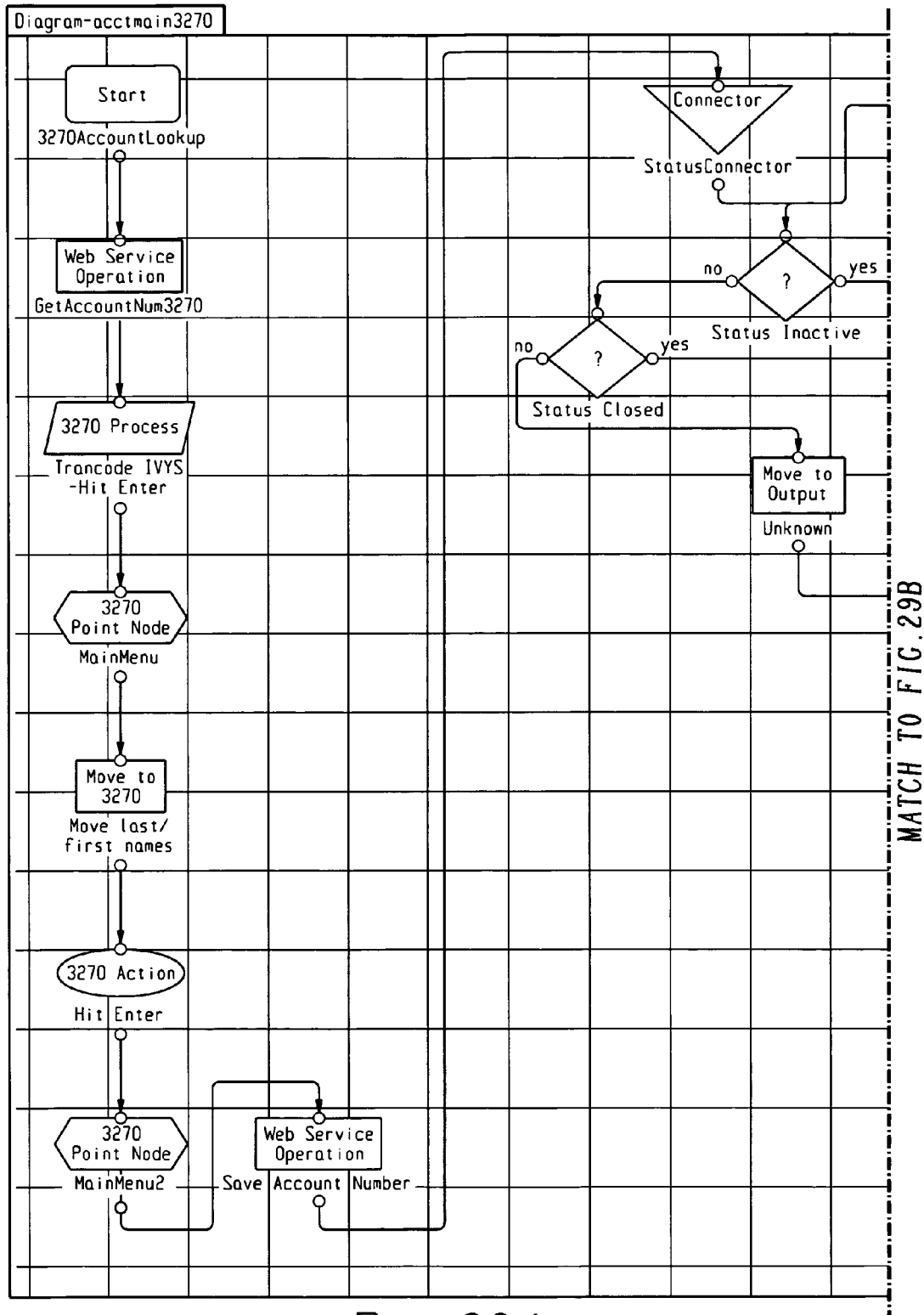
FIG. 29 depicts a sample graphical Web service definition accessing a mainframe application.
Figure 29B:
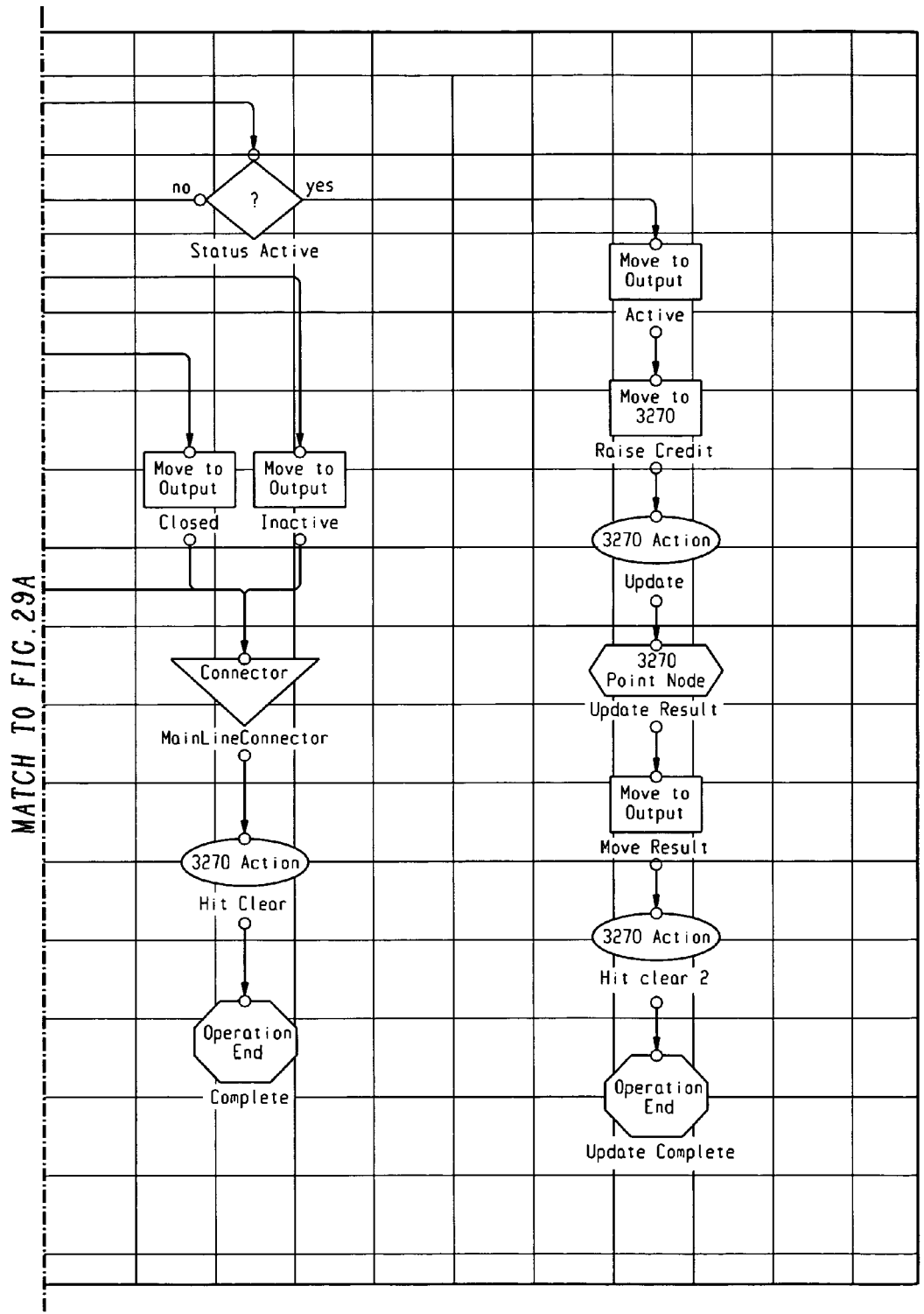

Continuing with the prior example, logic can be added to update or raise the credit limit based on the credit limit by executing additional 3270 BMS transactions. For example, FIG. 29 depicts such an enhanced graphical definition. This new task can reuse the original Web service in a new Web service.

Figure 30:
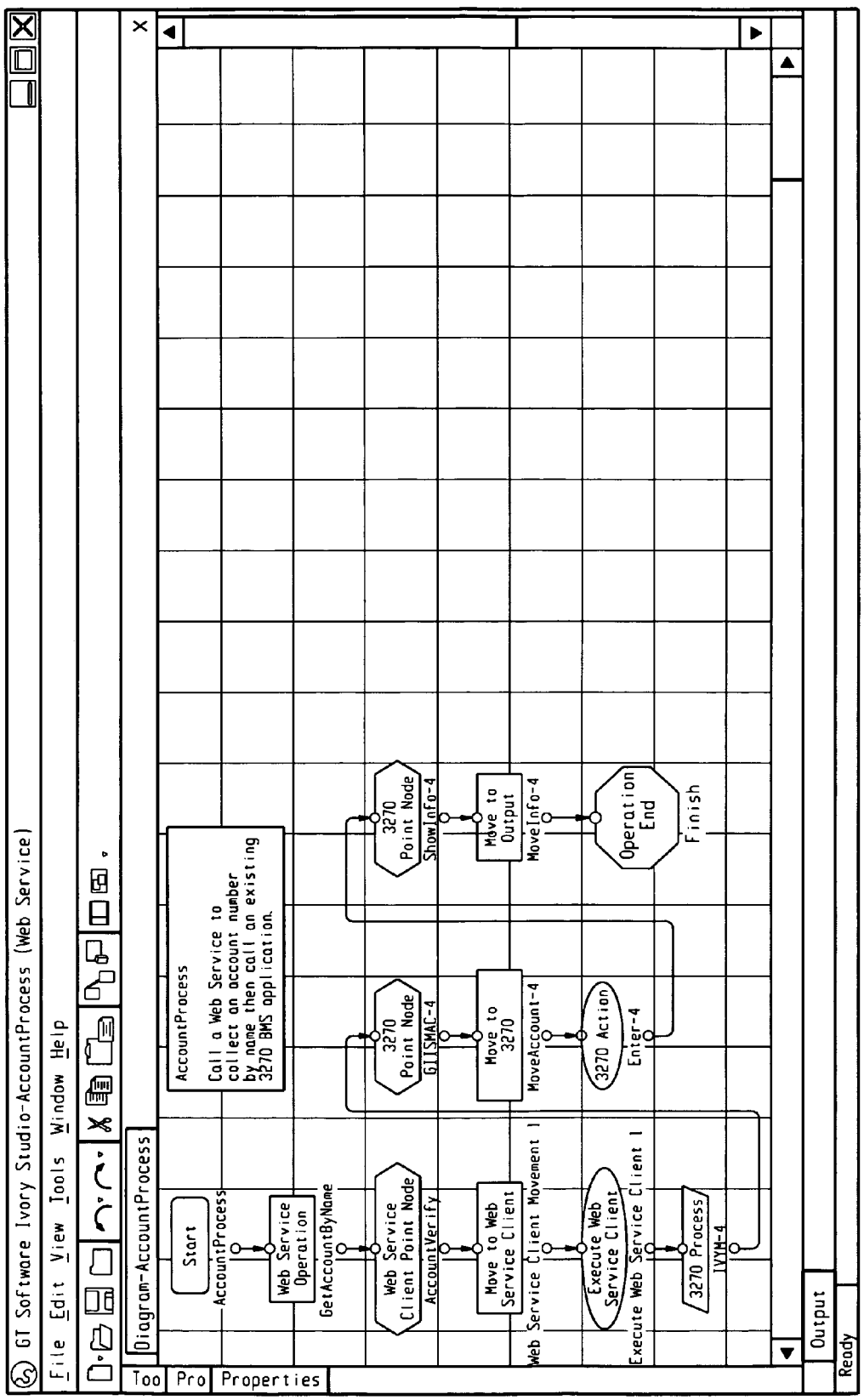
FIG. 30 demonstrates graphical definition of a composite Web service within an exemplary modeler.
Figure 31:
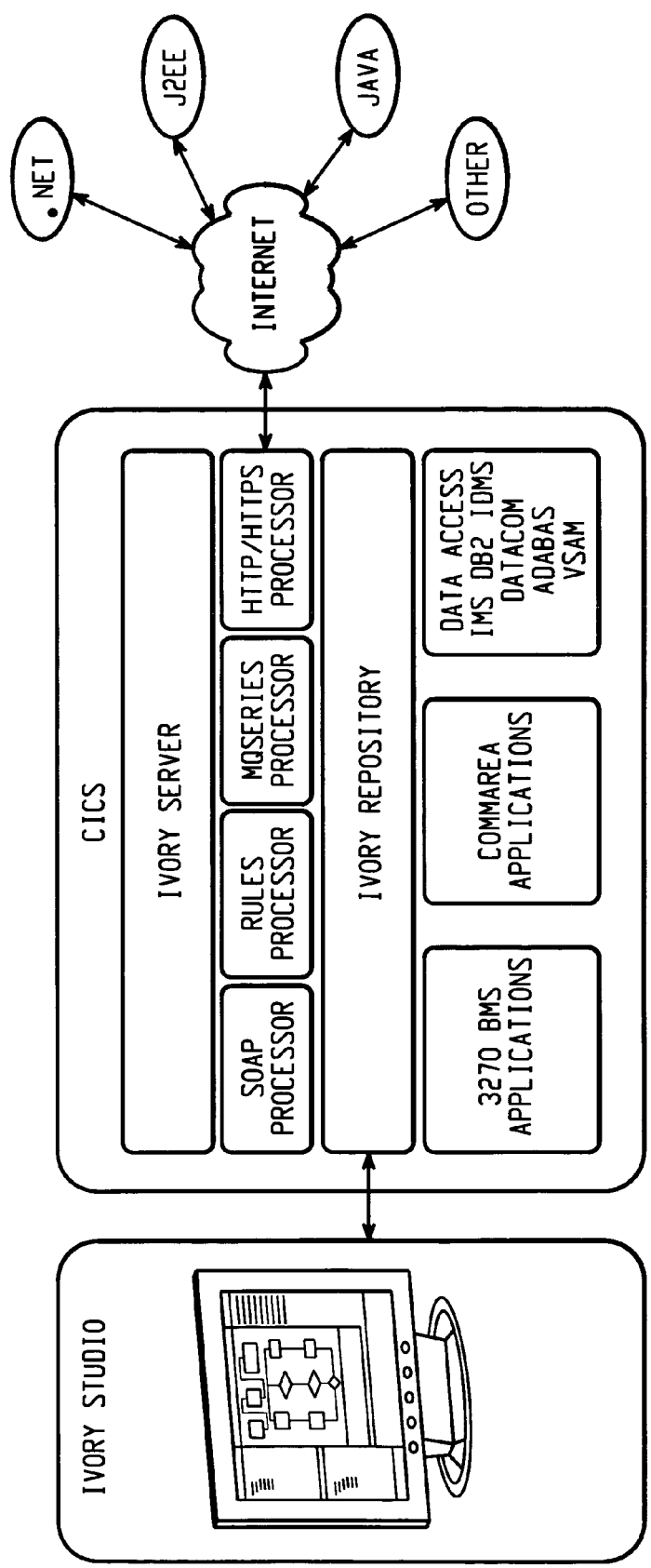
FIG. 31 depicts a typical deployment architecture for Web services using an exemplary modeler and server.

In another example depicted in FIG. 30, the original Web service, account look-up by name, was called as a Web Service Client Point Node and new logic was added to update the credit limit. The ability to consume an internal or external Web Services allows:

Simplification of logic.
Reuse of an existing Web services.
Interaction with a business partner with a different computer system.
Reuse of an external machines and programs, such as Windows NT and Unix.

If, for example, there is a need to validate a driver's license number, this Web service can consume a Web service published by a state agency to validate the driver's license number.

Going back to the original example, if the 3270 operator needs to execute a transaction on a Microsoft Windows application which publishes a new credit card after updating a credit limit, it can be automated by adding a Web Service Client Point Node to execute the Microsoft Windows-based Web service from the mainframe. Combining the 3270 operator's tasks to run as a single task can save time and money. This can all be done without writing a single line of mainframe program.

A mainframe Web service can be generated through diagramming a business process, such as getting insurance policy information for a user. A mainframe, for example, may have a separate application or business process for each type of insurance policy: home, car, and health. The described systems and methods can provide the ability to combine these separate business processes into a single business process implemented as one or more Web services.

The described systems and methods can include design and runtime functions. The design component can include a modeler and/or an interface to a mainframe application.

The modeler may provide the ability to change logic flow and the path of the original mainframe application. The runtime function component can include a mainframe Web service. The Web service interface is built around mainframe applications that reside on the mainframe. The described systems and methods can verify that the original mainframe application and Web service are in sync.

To summarize the functions, FIG. 30 provides an overview of the modeler and server in some of the systems and methods described herein. These systems and methods improve Web service development along several axis including one or more of the following:

Design Time:

Using the modeler/graphical IDE, the application flow and process is defined by dragging components to the Diagram window.

Deploy Time:

After building the Web services with the modeler/studio, instructions for the processing the Web services and the WSDL are uploaded to the server repository.

Run Time:

During the execution time, the server takes in SOAP request from applications written in .NET, J2EE, JAVA, or other programming languages, processes the Web services processing instructions, and returns the results to the application in a SOAP Response.

Throughout this application, various publications may have been referenced. The disclosures of these publications in their entireties are hereby incorporated by reference into this application in order to more fully describe the state of the art to which this application pertains.

The examples described above are given as illustrative only. It will be readily appreciated by those skilled in the art that many deviations may be made from the specific examples disclosed above without departing from the scope of the inventions set forth in this application and in the claims below.

The indentations and/or enumeration of limitations and/or steps in the claims that follow are provided purely for convenience and ease of reading and/or reference. Their usage is not intended to convey any substantive inference as to parsing of limitations and/or steps and/or to convey any substantive ordering of, or relationship between or among, the so indented and/or enumerated limitations and/or steps.

What is claimed is:

1. A system to facilitate the definition of a composite web service configured to support application flow and processing using a plurality of mainframe applications via a single simple object access protocol request, the composite web service providing access to multiple applications in a single web service by combining functions from the plurality of mainframe applications, the system comprising a system data store and a system processor and further comprising:

a modeler configured to interface with a user to enable the user to generate an application flow, the modeler including a graphical interface for building the application flow and data movements between the plurality of mainframe applications, the modeler creating one or more flow rules, generated as instructions in web services description language, to build the composite web service, wherein the modeler enables the user to define functionality required from the plurality of mainframe applications to be provided in the composite web service, wherein the composite web service includes at least one call to a mainframe application, and wherein the application flow is formed by a plurality of connected graphical objects and the application flow through various nodes controls logic processing for the plurality of mainframe applications which provide the user-defined composite web service functionality, and wherein the modeler includes a debugger configured to:
receive user-defined inputs and expected outputs for processing of the flow rules via the graphical interface, wherein the user-defined inputs and expected outputs are defined by each node and the web services description language instructions are created from properties entered into the graphical interface by the user, step through the flow rules, wherein the step through includes at least one call to a mainframe application, trace results of the step through, provide the trace results to the user via the graphical interface, and verify syntax of those flow rules that control execution of the plurality of mainframe applications by tracing a logic path for a connection included in the application flow to ensure a correct flow is processed by a requested web service operation, wherein syntax is verified each time a node connection is attempted to ensure a valid logic path and that node connection rules are correct; and a manager configured to parse the flow rules to generate a programmatic implementation of the composite web service for execution on a web services server, wherein the modeler is configured to utilize the debugger to verify the one or more flow rules of the composite web service by checking properties and connections between the nodes to ensure the flow rules are complete and valid prior to the modeler deploying the flow rules to the manager for generation of the programmatic implementation of the composite web service for execution on the web services server.

2. The system of claim 1, further comprising a web services server, wherein the web services server is configured (1) to receive a request from at least one web services client requesting the composite web service defined at the web services server and (2) to respond to the received request with an encoding of results generated by performing the requested composite web service.

3. The system of claim 2, wherein the web services server comprises a rules engine configured to process the programmatic implementation of the composite web service.

4. The system of claim 1, wherein the manager is configured to generate the programmatic implementation following standards defined in a web services description language file.

5. The system of claim 1, wherein the modeler comprises a library comprising at least one of standard functions and defined functions.

6. The system of claim 5, wherein the library comprises one or more user defined functions defined using the modeler.

7. The system of claim 1, wherein the plurality of mainframe applications include an electronic commerce application, and wherein the user-defined functionality for the composite web service includes electronic commerce.

8. The system of claim 1, wherein the modeler is further configured to enable the user to define one or more work variables for use within the composite or single use web services.

9. The system of claim 1, wherein the modeler is further configured to enable the user to orchestrate interactions between a first and a second mainframe application from the plurality of mainframe applications.

10. One or more computer readable media having software program code to facilitate the definition of a composite web service configured to support application flow and processing using a plurality of mainframe applications via a single simple object access protocol request, the composite web service providing access to multiple applications in a single web service by combining functions from the plurality of mainframe applications, the program code comprising:

modeler logic configured to interface with a user to enable the user to generate an application flow, the modeler logic including a graphical interface for building the application flow and data movements between the plurality of mainframe applications, the modeler logic creating one or more flow rules, generated as instructions in web services description language, to build the composite web service, wherein the modeler logic enables the user to define functionality required from the plurality of mainframe applications to be provided in the composite web service, wherein the composite web service includes at least one call to a mainframe application, and wherein the application flow is formed by a plurality of connected graphical objects and the application flow through various nodes controls logic processing for the plurality of mainframe applications which provide the user-defined composite web service functionality, and wherein the modeler logic includes debugger logic configured to:
receive user-defined inputs and expected outputs for processing of the flow rules via the graphical interface, wherein the user-defined inputs and expected outputs are defined by each node and the web services description language instructions are created from properties entered into the graphical interface by the user, step through the flow rules, wherein the step through includes at least one call to a mainframe application, trace results of the step through, provide the trace results to the user via the graphical interface, and verify syntax of those flow rules that control execution of the plurality of mainframe applications by tracing a logic path for a connection included in the application flow to ensure a correct flow is processed by a requested web service operation, wherein syntax is verified each time a node connection is attempted to ensure a valid logic path and that node connection rules are correct; and manager logic configured to parse the flow rules to generate a programmatic implementation of the composite web service for execution on a web services server, wherein the modeler logic is configured to utilize the debugger to verify the one or more flow rules of the composite web service by checking properties and connections between the nodes to ensure the flow rules are complete and valid prior to the modeler logic deploying the flow rules to the manager logic for generation of the programmatic implementation of the composite web service description for execution on the web services server.

11. The computer readable media of claim 10, wherein the modeler logic is further configured to provide output to the user in the form of the flow rules.

12. The computer readable media of claim 10, wherein the modeler logic is further configured to enable the user to choose among a plurality of flow rules functions to define the composite web service definition.

13. The computer readable media of claim 12, wherein the plurality of flow rules functions include at least two node types selected from the group consisting of a start node, a web service node, a link point node, a data movement node, a decision node, a loop node, a move-to-output node, a connector node, an end node, a calculation node, and a data source node.

14. The computer readable media of claim 12, wherein the plurality of flow rules functions include a web service node type.

15. The computer readable media of claim 10, wherein the modeler logic comprises orchestration logic configured to receive orchestration information from the user specifying interactions between the plurality of mainframe applications.

16. A system to facilitate the definition of a composite web service configured to support application flow and processing using a plurality of mainframe applications via a single simple object access protocol request, the composite web service providing access to multiple applications in a single web service by combining functions from the plurality of mainframe applications, the system comprising:
a) a graphical display device;
b) a user input device configured to be operable by a user;
c) a system data store configured to store one or more graphical, composite web service definitions; and
d) a system processor comprising one or more processing elements, wherein the system processor is in communication with the graphical display device, the user input device and the system data store and wherein the system processor is configured to:
provide a modeler interface with the graphical display device, the modeler interface being configured to enable the user to graphically define the composite web service using the user input device, wherein the modeler interface enables the user to generate an application flow, the modeler interface including a graphical interface for building the application flow and data movements between the plurality of mainframe applications, the modeler interface creating one or more flow rules, generated as instructions in web services description language, to build the composite web service,
wherein the modeler interface enables the user to define functionality required from the plurality of mainframe applications to be provided in the composite web service, wherein the composite web service includes at least one call to a mainframe application, and
wherein the application flow is formed by a plurality of connected graphical objects and the application flow through various nodes controls logic processing for the plurality of mainframe applications which provide the user-defined composite web service functionality, and
wherein the modeler interface includes a debug interface configured to:
receive user-defined inputs and expected outputs for processing of the flow rules via the graphical interface, wherein the user-defined inputs and expected outputs are defined by each node and the web services description language instructions are created from properties entered into the graphical interface by the user,
step through the flow rules, wherein the step through includes at least one call to a mainframe application,
trace results of the step through, and
provide, via the graphical interface on the graphical display device, the trace results, and
verify syntax of those flow rules that control execution of the plurality of mainframe applications by tracing a logic path for a connection included in the application flow to ensure a correct flow is processed by a requested web service operation, wherein syntax is verified each time a node connection is attempted to ensure a valid logic path and that node connection rules are correct,
display, on the graphical display device, a graphical representation of at least a portion of the user-defined, composite web service definition, and
store in the system data store a digital representation of graphically defined composite web service; and
provide a manager configured to parse the flow rules to generate a programmatic implementation of the composite web service for execution on a web services server,
wherein the modeler interface is configured to utilize the debugger interface to verify the one or more flow rules of the composite web service by checking properties and connections between the nodes to ensure the flow rules are complete and valid prior to the modeler interface deploying the flow rules to the manager for generation of the programmatic implementation of the composite web service for execution of the web services server.

17. The system of claim 16, further comprising a communication interface coupled to a communication channel enabling communication from the system processor to the web services server, wherein the system processor is further configured to transmit the programmatic implementation of the selected web service to the web services server via the communication interface.

18. The system of claim 16, wherein the debug interface comprises a palette of at least one of standard functions and defined functions.

19. The system of claim 18, wherein the palette comprises at least one defined function defined using the provided interface.

20. The system of claim 18, wherein the palette comprises a web service node type.

21. The system of claim 16, wherein the provided interface is further configured to enable the user to define one or more work variables for use within the graphically defined composite web service.

22. A method to facilitate the definition of a composite web service configured to support application flow and processing using a plurality of mainframe applications via a single simple object access protocol request, the composite web service providing access to multiple applications in a single web service by combining functions from the plurality of mainframe applications, the method comprising:

providing a modeler interface with a graphical display device, the modeler interface being configured to enable a user to graphically define the composite web service using a user input device, wherein the modeler interface enables the user to generate an application flow, the modeler interface including a graphical interface for building the application flow and data movements between the plurality of mainframe applications, the modeler interface creating one or more flow rules, generated as instructions in web services description language, to build the composite web service, wherein the modeler interface is further configured to enable the user to define functionality required from the plurality of mainframe applications to be provided in the composite web service, wherein the composite web service includes at least one call to a mainframe application, and wherein the application flow is formed by a plurality of connected graphical objects and the application flow through various nodes controls logic processing for the plurality of mainframe applications which provide the user-defined composite web service functionality, and wherein the modeler interface includes a debug interface configured to:
receive user-defined inputs and expected outputs from processing of the flow rules,
step through the flow rules, wherein the step through includes at least one call to a mainframe application,
trace results of the step through,
provide, via the graphical interface on the graphical display device, the trace results to the user via the graphical interface on the graphical display, and
verify syntax of those flow rules that control execution of the plurality of mainframe applications by tracing a logic path for a connection included in the application flow to ensure a correct flow is processed by a requested web service operation, wherein syntax is verified each time a node connection is attempted to ensure a valid logic path and that node connection rules are correct;

providing a manager configured to parse the flow rules to generate a programmatic implementation of the composite web service for execution on a web services server, wherein the modeler interface is configured to utilize the debugger to verify the one or more flow rules of the composite web service by checking properties and connections between the nodes to ensure the flow rules are complete and valid prior to the modeler deploying the flow rules to the manager for generation of the programmatic implementation of the composite web service for execution on the web services server;

displaying, on the graphical display device, a graphical representation of at least a portion of the user-defined, composite web service definition; and storing, in a system data store, a digital representation of the graphically defined composite web service.

23. The method of claim 22, further comprising transmitting the programmatic implementation of the composite web service to the web services server.

24. One or more computer readable media storing instructions that upon execution by a system processor cause the system processor to perform the method of claim 22.

25. The method of 22, wherein the provided interface is further configured to enable the user to define one or more work variables for use within the graphically defined composite web service.

26. A system to facilitate the definition of a composite web service configured to support application flow and processing using a plurality of mainframe applications via a single simple object access protocol request, the composite web service providing access to multiple applications in a single web service by combining function from the plurality of mainframe applications, the system comprising a system data storage means and a system processor and further comprising:

means for graphically defining the composite web service which includes a plurality of functions, wherein each function is of a type selected from the group consisting of a standard function and a user defined function, wherein the means for graphically defining the composite web service is configured to interface with a user to enable the user to generate an application flow, the means for graphically defining the composite web service including a graphical interface for building the application flow and data movements between the plurality of mainframe applications, the means for graphically defining the composite web service creating one or more flow rules to build the composite web service, wherein the means for graphically defining the composite web service enables the user to define functionality required from the plurality of mainframe applications to be provided in the composite web service, wherein the composite web service includes at least one call to a mainframe application, and wherein the application flow is formed by a plurality of connected graphical objects and the application flow through various nodes controls logic processing for the plurality of mainframe applications which provide the user-defined composite web service functionality, and wherein the means for graphically defining the web service includes a means for debugging configured to:
receive user-defined inputs and expected outputs for processing of the flow rules via the graphical interface, wherein the user-defined inputs and expected outputs are defined by each node and the web services description language instructions are created from properties entered into the graphical interface by the user,
step through the flow rules, wherein the step through includes at least one call to a mainframe application,
trace results of the step through,
provide the trace results to the user via the graphical interface, and
verify syntax of those flow rules that control execution of the plurality of mainframe applications by tracing a logic path for a connection included in the application flow to ensure a correct flow is processed by a requested web service operation, wherein syntax is verified each time a node connection is attempted to ensure a valid logic path and that node connection rules are correct;

means for converting the graphically defined web service into a programmatic implementation operable to execute on a web services server, wherein the means for graphically defining the composite web service is configured to utilize the means for debugging to verify the one or more flow rules of the composite web service by checking properties and connections between the nodes to ensure the flow rules are complete and valid prior to the means for graphically defining the composite web service deploying the flow rules to the means for converting for generation of the programmatic implementation of the composite web service for execution on the web services server.

* * * * *